(12) United States Patent
Kumano

(10) Patent No.: US 7,473,507 B2
(45) Date of Patent: Jan. 6, 2009

(54) ELECTROPHOTOGRAPHIC PHOTORECEPTOR WITH POLYESTER RESIN IN PHOTOSENSITIVE LAYER

(75) Inventor: Yuuta Kumano, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/293,387

(22) Filed: Dec. 5, 2005

(65) Prior Publication Data

US 2006/0073400 A1      Apr. 6, 2006

Related U.S. Application Data

(63) Continuation of application No. PCT/JP2004/012915, filed on Aug. 31, 2004.

(30) Foreign Application Priority Data

Sep. 2, 2003      (JP) ............................. 2003-310700

(51) Int. Cl.
*G03G 5/05* (2006.01)
(52) U.S. Cl. ........................................ 430/96; 430/59.6
(58) Field of Classification Search .................. 430/96, 430/59.6, 66, 67
See application file for complete search history.

(56) References Cited

U.S. PATENT DOCUMENTS

| 5,804,344 | A | 9/1998 | Mitsumori | |
|---|---|---|---|---|
| 6,030,734 | A | 2/2000 | Mitsumori | |
| 6,884,556 | B2 | 4/2005 | Kumano et al. | |
| 2001/0049067 | A1* | 12/2001 | Mitsumori et al. | 430/58.8 |
| 2002/0025483 | A1* | 2/2002 | Kawamura et al. | 430/59.6 |
| 2003/0087173 | A1* | 5/2003 | Kumano et al. | 430/96 |
| 2005/0079431 | A1* | 4/2005 | Kobashi et al. | 430/59.6 |
| 2006/0078810 | A1* | 4/2006 | Kumano | 430/59.6 |

FOREIGN PATENT DOCUMENTS

| JP | 56-135844 | 10/1981 |
|---|---|---|
| JP | 3-6567 | 1/1991 |
| JP | 9-244278 | 9/1997 |
| JP | 10-288845 | 10/1998 |
| JP | 2002-107970 | 4/2002 |
| JP | 2002-265574 | 9/2002 |
| JP | 2002-275133 | 9/2002 |
| JP | 2003-140369 | 5/2003 |
| JP | 2003-140370 | 5/2003 |
| JP | 2003-195540 | 7/2003 |
| JP | 2003195540 A * | 7/2003 |

OTHER PUBLICATIONS

U.S. Appl. No. 11/288,195, filed Nov. 29, 2005, Kumano.
First Notification of Office Action dated Nov. 9, 2007 (w/English Translation).

* cited by examiner

*Primary Examiner*—Christopher RoDee
(74) *Attorney, Agent, or Firm*—Oblon, Spivak, McClelland, Maier & Neustadt, P.C.

(57) ABSTRACT

An electrophotographic photoreceptor, which contains a polyester resin having a repeating structure comprising a bivalent phenol residue represented by the following formula (1) and an aromatic dicarboxylic acid residue represented by the following formula (2):

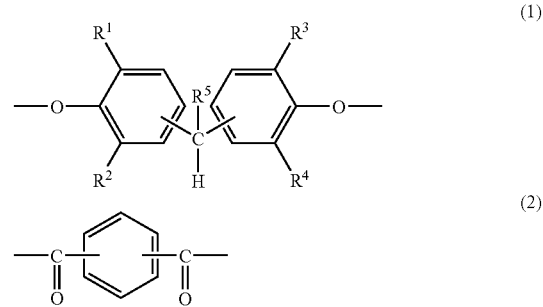

in the formula (1), each of $R^1$ to $R^4$ which are independent of one another, represents a hydrogen atom or an alkyl group, and $R^5$ represents an alkyl group.

8 Claims, 1 Drawing Sheet the present invention relates to an electrophotographic
ELECTROPHOTOGRAPHIC PHOTORECEPTOR WITH POLYESTER RESIN IN PHOTOSENSITIVE LAYER

TECHNICAL FIELD

The present invention relates to an electrophotographic photoreceptor. Particularly, it relates to an electrophotographic photoreceptor containing a resin for an electrophotographic photoreceptor excellent in abrasion resistance, surface slip properties, solubility when a coating liquid is prepared, and storage stability of the coating liquid, and having favorable electric response characteristics.

BACKGROUND ART

An electrophotographic technology has found widespread applications in the field of copying machines, and various printers because it can provide an image of immediacy and high quality.

As for the photoreceptor which is the core of the electrophotographic technology, photoreceptors using organic photoconductive materials having advantages of entailing no pollution, ensuring easy film-forming, being easy to manufacture, and the like, have been used.

As the photoreceptors using organic photoconductive materials, there are known a so-called dispersion type photoreceptor obtained by dispersing a photoconductive fine powder in a binder resin, and a lamination type photoreceptor obtained by laminating a charge generation layer and a charge transport layer. The lamination type photoreceptor has a high possibility of ranking as a dominant photoreceptor because a high sensitivity photoreceptor can be provided by using a charge generation material and a charge transport material each having a high efficiency in combination, a high safety photoreceptor can be obtained because of its wide material selection range, and it is advantageous in terms of cost due to its high productivity since a photosensitive layer can easily be formed by coating. Therefore, it has been vigorously developed and has gone into actual use.

The electrophotographic photoreceptor is repeatedly used in an electrophotographic process, i.e., in cycles of charging, exposure, development, transfer, cleaning, charge removal, and the like, during which it is subjected to various stresses to be deteriorated. Such deterioration includes chemical or electrical deterioration due to the following facts. That is, strongly oxidizing ozone or $NO_x$ arisen from, for example, a corona charger commonly used as a charger causes a chemical damage to a photosensitive layer, carriers (current) generated upon image exposure pass through the inside of the photosensitive layer, a photosensitive layer composition is decomposed by charge-removed light or light from the outside. Further, as other deterioration than such deterioration, there are mechanical deteriorations of abrasion or occurrence of flaws on the surface of the photosensitive layer, or peeling off of a film due to rubbing with a cleaning blade, a magnetic brush, or the like, contact with a developing agent or paper, and the like. Especially, such damage occurring on the photosensitive layer surface tends to become evident on the copied image. Accordingly, it directly damages the image quality and hence it is largely responsible for restricting the life of the photoreceptor. Namely, the enhancement of the electrical and chemical durability as well as the enhancement of the mechanical strength are essential conditions for developing a long-life photoreceptor.

In the case of a general photoreceptor having no functional layer such as a surface protective layer, it is a photosensitive layer that receives such a load. The photosensitive layer generally comprises a binder resin and a photoconductive material. It is the binder resin that substantially determines the strength. However, since the amount of the photoconductive material to be doped is considerably large, a sufficient mechanical strength has not yet been achieved.

Further, there has been a demand for a material adaptable to a higher-speed electrophotographic process to meet a growing need for a higher-speed printing. In this case, the photoreceptor is required not only to have a high sensitivity and a long life, but also to have good response characteristics so as to reduce the length of time between exposure and development thereof. It is known that, although the response characteristics are controlled by the charge transport layer, especially the charge transport material, it is also largely changed by the binder resin.

Each of the layers constituting the electrophotographic photoreceptor is formed by coating a coating liquid containing a photoconductive material, a binder resin and the like on a substrate by dip coating, spray coating, nozzle coating, bar coating, roll coating, blade coating, or the like. In such a method of forming layers, a known method of coating a coating liquid obtained by dissolving materials to be contained in the layer in a solvent, for example, has been applied. In many processes, a coating liquid is preliminarily prepared and preserved. Accordingly, the binder resin is required to be excellent also in solubility in a solvent used for coating process, and stability of the coating liquid after dissolution.

As the binder resins of the photosensitive layer, there have been used thermoplastic resins and various thermosetting resins, including vinyl polymers such as polymethyl methacrylate, polystyrene, and polyvinyl chloride, and copolymers thereof, polycarbonate, polyester, polysulfone, phenoxy, epoxy, and silicone resins. The polycarbonate resin has a relatively excellent performance out of a large number of the binder resins, and hence various polycarbonate resins have been developed and have gone into actual use so far (for example, JP-A-50-98332, JP-A-59-71057, JP-A-59-184251, JP-A-5-21478).

On the other hand, there is disclosed the technology of an electrophotographic photoreceptor using a polyarylate resin, commercially available under the tradename "U-polymer", as a binder, and it is disclosed that the electrophotographic photoreceptor is particularly excellent in sensitivity as compared with the one using polycarbonate (for example, JP-A-56-135844).

Further, there is disclosed the technology of an electrophotographic photoreceptor using as a binder resin a polyarylate resin using a bivalent phenol component having a specific structure, and it has been known that the solution stability in manufacturing the photoreceptor improves and that the electrophotographic photoreceptor is excellent in the mechanical strength, especially the abrasion resistance (for example, JP-A-3-6567, JP-A-10-288845).

However, a conventional photoreceptor has such drawbacks that its surface is abraded by practical loads such as development by a toner, abrasion by paper and abrasion by a cleaning member (blade) or its surface may be scarred. Thus, in actuality, its printing performance is limited practically.

DISCLOSURE OF THE INVENTION

An electrophotographic photoreceptor using a conventionally known binder resin is insufficient in view of electric characteristics, although it has improved strength and the like, and when it is formed into a coating liquid for formation of a photosensitive layer, the liquid is poor in stability and it may undergo white turbidity or gelation.

It is an object of the present invention to provide an electrophotographic photoreceptor which provides a highly stable coating liquid for formation of a photosensitive layer, which is excellent in electric characteristics and further has high mechanical strength, and the surface of which is less likely to be abraded or scarred even by practical loads such as development by a toner, abrasion by paper and abrasion by a cleaning member (blade).

The present inventors have found that a photoreceptor which has sufficient mechanical characteristics, which has a high solubility in a solvent to be used for a coating liquid for formation of a photosensitive layer and provides excellent stability of the coating liquid, and which is excellent in electric characteristics, can be obtained by incorporating a specific polyester resin in a photosensitive layer, and achieved the present invention.

Namely, the present invention resides in an electrophotographic photoreceptor comprising an electroconductive substrate and a photosensitive layer formed thereon, characterized in that the photosensitive layer contains a polyester resin having a repeating ester structure comprising a bivalent phenol residue represented by the following formula (1) and an aromatic dicarboxylic acid residue represented by the following formula (2):

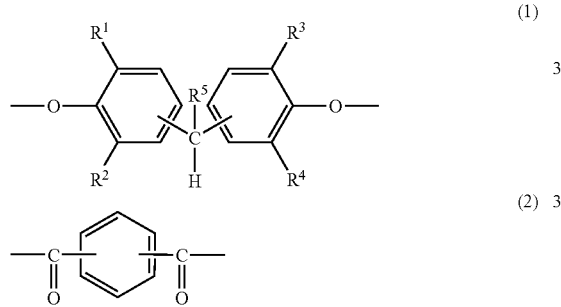

in the formula (1), each of $R^1$ to $R^4$ which are independent of one another, represents a hydrogen atom or an alkyl group, and $R^5$ represents an alkyl group.

EFFECTS OF THE INVENTION

According to the present invention, it is possible to provide an electrophotographic photoreceptor which provides a highly stable coating liquid for formation of a photosensitive layer, which is excellent in electric characteristics and further has high mechanical strength, and the surface of which is less likely to be abraded or scarred by practical loads such as development by a toner, abrasion by paper and abrasion by a cleaning member (blade), by incorporating the specific polyester resin of the present invention in its photosensitive layer.

EXPLANATION OF SYMBOLS

Figure 1:
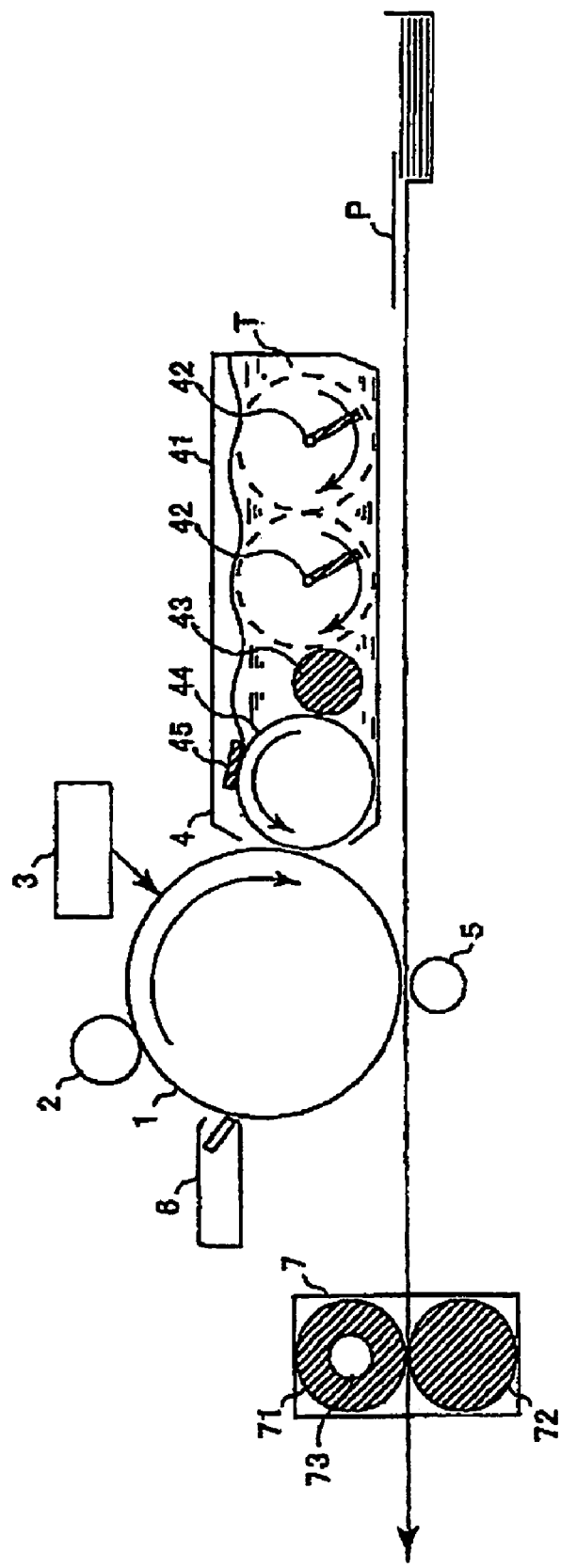
FIG. 1 is a drawing schematically illustrating the essential structure of one embodiment of an image forming apparatus equipped with the electrophotographic photoreceptor of the present invention.

1 photoreceptor, 2 charging apparatus (charging roller), 3 exposure apparatus, 4 developing apparatus, 5 transfer apparatus, 6 cleaning apparatus, 7 fixing apparatus, 41 developing tank, 42 agitator, 43 supply roller, 44 developing roller, 55 control member, 71 upper fixing member (fixing roller), 72 lower fixing member (fixing roller), 73 heating apparatus, T toner, P recording paper (paper sheet, medium)

BEST MODE FOR CARRYING OUT THE INVENTION

Now, the present invention will be explained in detail with reference to the preferred embodiments. However, the following explanation represents typical examples of the embodiments of the present invention, and various changes and modifications can be made without departing from the spirit and scope of the present invention.

The photosensitive layer of the electrophotographic photoreceptor of the present invention contains a polyester resin having a repeating ester structure comprising a bivalent phenol residue represented by the following formula (1) and an aromatic dicarboxylic acid residue represented by the following formula (2):

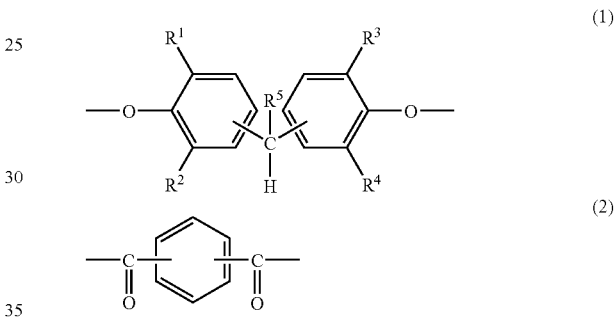

in the formula (1), each of $R^1$ to $R^4$ which are independent of one another, represents a hydrogen atom or an alkyl group, and $R^5$ represents an alkyl group.

The photosensitive layer of the electrophotographic photoreceptor of the present invention contains the above polyester resin, and the resin is used as a binder resin in the photosensitive layer to be formed on an electroconductive support of the photoreceptor.

As a specific structure of the photosensitive layer of the present invention, the following examples may be mentioned:

A lamination type photoreceptor obtained by laminating a charge generation layer containing a charge generation material as the main component and a charge transport layer containing a charge transport material and a binder resin as the main components are laminated in this order on an electroconductive support, a reversed two-layer type photoreceptor obtained by laminating a charge transport layer containing a charge transport material and a binder resin as the main components and a charge generation layer containing a charge generation material as the main component in this order on an electroconductive support, and a dispersion type (monolayer type) photoreceptor obtained by dispersing a charge generation material in a layer containing a charge transport material and a binder resin on an electroconductive support.

In the present invention, the polyester resin is used usually for a layer containing a charge transport material, preferably for a charge transport layer in the lamination type photosensitive layer.

The polyester resin according to the present invention may be used for an electrophotographic photoreceptor as mixed with another resin. Said another resin to be used in combination may, for example, be thermoplastic resins and various thermosetting resins, including vinyl polymers such as polymethyl methacrylate, polystyrene and polyvinyl chloride, and copolymers thereof, polycarbonate, polyester, polyester polycarbonate, polysulfone, phenoxy, epoxy and silicone resins. Among such resins, a polycarbonate resin or a polyester polycarbonate resin is preferred.

The amount of another resin used in combination may be any proportion, but it is preferably not larger than the amount of the polyester resin according to the present invention in the layer containing the polyester resin according to the present invention, and it is more preferably at most 20 wt % based on the polyester resin according to the present invention. If the amount of another resin used in combination is too large, the effect of the polyester resin of the present invention tends to be small.

(Polyester Resin)

The photosensitive layer of the electrophotographic photoreceptor of the present invention contains a polyester resin having a repeating ester structure comprising a residue represented by the formula (1) and a residue represented by the formula (2). The polyester resin may be a copolymer with a repeating structure which another resin capable of being used for an electrophotographic photoreceptor has. In such a case, another repeating structure may be a repeating structure of a polycarbonate resin or a repeating structure of a polyester resin. More specifically, the polyester resin may be a polyester polycarbonate resin which is a copolymer with a repeating structure which a polycarbonate resin has, or a copolymer with a repeating structure of another polyester resin different from one which the polyester resin of the present invention has. Among them, preferred is a copolymer of polyester resins. In such a case, preferred is a copolymer with a repeating structure having an aromatic dicarboxylic acid residue, as same as one which the polyester resin according to the present invention has.

In a case where the polyester resin according to the present invention is a copolymer of polyester resins, the amount of the repeating ester structure comprising a residue represented by the formula (1) and a residue represented by the formula (2) is preferably at least 10 wt %, more preferably at least 20 wt %, particularly preferably at least 30 wt %, of the entire polyester resins of the copolymer.

In the formula (1), each of $R^1$ to $R^4$ which are independent of one another, represents a hydrogen atom or an alkyl group, and $R^5$ represents an alkyl group. The carbon number of such alkyl groups is not particularly limited, but such alkyl groups have a carbon number of preferably from 1 to 20, more preferably from 1 to 10, particularly preferably 1 or 2, so as to improve characteristics as a binder resin which binds a photosensitive layer.

Any one of $R^1$ to $R^4$ is preferably an alkyl group, more preferably $R^1$ and $R^3$ are independently alkyl groups, and particularly preferably $R^1$ and $R^3$ are independently methyl groups, so as to improve solubility in a coating liquid for formation of a photosensitive layer.

Any one of $R^1$ to $R^4$ is preferably a hydrogen atom, and particularly preferably $R^2$ and $R^4$ are hydrogen atoms, so as to increase mechanical characteristics, particularly abrasion resistance.

Specifically, the bivalent phenol component which provides the bivalent phenol residue represented by the formula (1) may, for example, be 1,1-bis-(4-hydroxyphenyl)ethane, 1,1-bis-(4-hydroxy-3-methylphenyl)ethane, 1,1-bis-(4-hydroxy-3,5-dimethylphenyl)ethane, 1-(4-hydroxyphenyl)-1-(4-hydroxy-3-methylphenyl)ethane, 1,1-bis-(4-hydroxy-3-ethylphenyl)ethane, 1,1-bis-(4-hydroxy-3,5-diethylphenyl)ethane, 1-(4-hydroxyphenyl)-1-(4-hydroxy-3-ethylphenyl)ethane, 1,1-bis-(4-hydroxy-3-propylphenyl)ethane, 1,1-bis-(4-hydroxy-3,5-dipropylphenyl)ethane, 1-(4-hydroxyphenyl)-1-(4-hydroxy-3-propylphenyl)ethane, 1,1-bis-(4-hydroxy-3-t-butylphenyl)ethane, 1,1-bis-(4-hydroxy-3,5-di-t-butylmethylphenyl)ethane, 1-(4-hydroxyphenyl)-1-(4-hydroxy-3-t-butylphenyl)ethane, 1,1-bis-(4-hydroxyphenyl)propane, 1,1-bis-(4-hydroxy-3-methylphenyl)propane, 1,1-bis-(4-hydroxy-3,5-dimethylphenyl)propane, 1-(4-hydroxyphenyl)-1-(4-hydroxy-3-methylphenyl)propane, 1,1-bis-(4-hydroxy-3-ethylphenyl)propane, 1,1-bis-(4-hydroxy-3,5-diethylphenyl)propane, 1-(4-hydroxyphenyl)-1-(4-hydroxy-3-ethylphenyl)propane, 1,1-bis-(4-hydroxy-3-propylphenyl)propane, 1,1-bis-(4-hydroxy-3,5-dipropylphenyl)propane, 1-(4-hydroxyphenyl)-1-(4-hydroxy-3-propylphenyl)propane, 1,1-bis-(4-hydroxy-3-t-butylphenyl)propane, 1,1-bis-(4-hydroxy-3,5-di-t-butylmethylphenyl)propane or 1-(4-hydroxyphenyl)-1-(4-hydroxy-3-t-butylphenyl)propane, and it is preferably one wherein $R^5$ is a methyl group, such as 1,1-bis-(4-hydroxyphenyl)ethane, 1,1-bis-(4-hydroxy-3-methylphenyl)ethane, 1,1-bis-(4-hydroxy-3,5-dimethylphenyl)ethane or 1-(4-hydroxyphenyl)-1-(4-hydroxy-3-methylphenyl)ethane, and it is particularly preferably 1,1-bis-(4-hydroxy-3-methylphenyl)ethane.

The repeating structure of the polyester resin of the present invention has an aromatic dicarboxylic acid residue represented by the formula (2), and the aromatic dicarboxylic acid residue is preferably a terephthaloyl group or an isophthaloyl residue, and the polyester resin may be a copolymer having a repeating structure having a terephthaloyl residue and a repeating structure having an isophthaloyl residue. As the aromatic dicarboxylic acids corresponding to the terephthaloyl group and the isophthaloyl group, a terephthalic acid derivative and an isophthalic acid derivative are used. More specifically, terephthaloyl halide and isophthaloyl halide may, for example, be used. Particularly, terephthaloyl chloride and isophthaloyl chloride are preferably used. Further, a mixture thereof may also be used. In such a case, as the molar ratio of the repeating structure having a terephthaloyl group and the repeating structure having an isophthaloyl group, the proportion of the structure having a terephthaloyl group based on the total of the repeating structure having a terephthaloyl group and the repeating structure having an isophthaloyl group is usually at least 1 wt % and at most 100 wt %, preferably at least 50 wt %, particularly preferably at least 90 wt %, and furthermore preferably the entire structure consists of repeating structures comprising a terephthaloyl group. If the proportion of the structure having a terephthaloyl group is small, the electric characteristics tend to decrease or mechanical characteristics tend to decrease when a photoreceptor is formed.

As mentioned above, the polyester resin according to the present invention may be a polyester resin which is a copolymer with another repeating structure. In such a case, the polyester resin preferably has a repeating ester structure comprising a bivalent phenol residue represented by the formula (1) and an aromatic dicarboxylic acid residue represented by the formula (2) and a repeating ester structure comprising a bivalent phenol residue represented by the following formula (3) and an aromatic dicarboxylic acid residue represented by the formula (2):

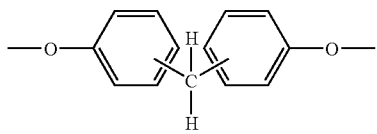
(3)

As the molar ratios of {the repeating ester structure comprising a residue represented by the formula (1) and a residue represented by the formula (2)} and {the repeating ester structure comprising a residue represented by the formula (3) and a residue represented by the formula (2)}, the proportion of {the repeating ester structure comprising a residue represented by the formula (1) and a residue represented by the formula (2)} to {the total of the repeating ester structure comprising a residue represented by the formula (1) and a residue represented by the formula (2) and the repeating ester structure comprising a residue represented by the formula (3) and a residue represented by the formula (2)} is usually at least 10%, preferably at least 20%, particularly preferably at least 50%, and usually at most 90%, preferably at most 80%, particularly preferably at most 70%. If the molar ratio of the repeating structure comprising a bivalent phenol residue represented by the formula (1) is too low, the solubility in a solvent and stability of the solution tend to be poor, and if the molar ratio is too high, mechanical characteristics of the photoreceptor tend to decrease.

Further, among bivalent phenol residues represented by the formula (3), preferred are residues represented by the following formulae (4), (5) and (6). In such a case, the polyester resin according to the present invention particularly preferably has at least two types of repeating ester structures selected from the group consisting of repeating ester structures comprising such bivalent phenol residues and an aromatic dicarboxylic acid residue represented by the formula (2). Furthermore, it preferably has at least a repeating ester structure comprising a residue represented by the formula (4) and a residue represented by the formula (2):

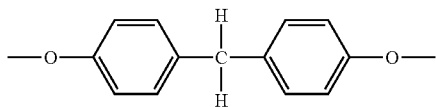
(4)

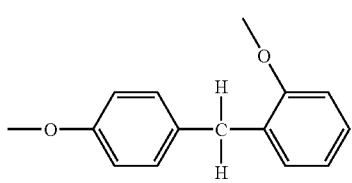
(5)

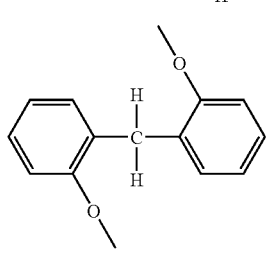
(6)

Bivalent phenol components corresponding to the bivalent phenol residues represented by the formulae (4), (5) and (6) may, specifically, be bis(4-hydroxyphenyl)methane (hereinafter sometimes referred to as p,p'-BPF), (2-hydroxyphenyl)(4-hydroxyphenyl)methane (hereinafter sometimes referred to as o,p'-BPF) and bis(2-hydroxyphenyl)methane (hereinafter sometimes referred to as o,o'-BPF), respectively.

When the molar ratio of the repeating structure comprising a residue represented by the formula (1) and a residue represented by the formula (2) is m, the molar ratio of the repeating structure comprising a residue represented by the formula (4) and a residue represented by the formula (2) is n, the molar ratio of the repeating structure comprising a residue represented by the formula (5) and a residue represented by the formula (2) is o, and the molar ratio of the repeating structure comprising a residue represented by the formula (6) and a residue represented by the formula (2) is p (provided that $m+n+o+p=1$), $m/(m+n+o+p)$ is usually at least 0.1, preferably at least 0.3, and usually at most 0.9, preferably at most 0.7. $n/(m+n+o+p)$ is usually at least 0.01, preferably at least 0.1, and usually at most 0.4, preferably at most 0.3. $o/(m+n+o+p)$ is usually at most 0.6, preferably at most 0.5, and $p/(m+n+o+p)$ is usually at most 0.3, preferably at most 0.2. Further, $(m+n):(o+p)$ is usually within a range of from 3:7 to 95:5, more preferably within a range of from 5:5 to 9:1.

If the molar ratio of the repeating ester structure comprising a residue represented by the formula (1) and a residue represented by the formula (2) is too high, the mechanical characteristics tend to decrease, and if it is too low, the solubility in an organic solvent which is commonly used for a coating liquid for formation of a photosensitive layer and the stability of the coating liquid tend to be poor. Further, if the molar ratio of the repeating ester structure comprising a residue represented by the formula (4) and a residue represented by the formula (2) is too high, the solubility in an organic solvent which is commonly used for a coating liquid for formation of a photosensitive layer and the stability of the coating liquid tend to be poor, and if it is too low, the mechanical characteristics of the photoreceptor tends to decrease. Further, if the molar ratio of the repeating ester structure comprising a residue represented by the formula (5) and a residue represented by the formula (2) is too high, the reactivity when the resin is polymerized tends to decrease, whereby it tends to be difficult to control the molecular weight, or it tends to be difficult to obtain a high molecular weight product. If the molar ratio of the repeating ester structure comprising a residue represented by the formula (6) and a residue represented by the formula (2) is too high, the mechanical characteristics, particularly abrasion resistance of the photoreceptor tends to decrease.

The proportions of {the total of the repeating ester structure comprising a residue represented by the formula (1) and a residue represented by the formula (2) and the repeating ester structure comprising a residue represented by the formula (4) and a residue represented by the formula (2)} to {the total of the repeating ester structure comprising a residue represented by the formula (5) and a residue represented by the formula (2) and the repeating ester structure comprising a residue represented by the formula (6) and a residue represented by the formula (2)} influences over the balance of performances and characteristics, such as easiness of the resin preparation, quality of the electric characteristics and quality of the mechanical characteristics.

(Method for Producing Resin for Electrophotographic Photoreceptor)

As a method for producing the resin for the electrophotographic photoreceptor of the present invention, a known polymerization method may be employed. It may, for example, be an interfacial polymerization method, a molten polymerization method or a solution polymerization method.

For example, in a case of production by an interfacial polymerization method, a solution having a bivalent phenol component dissolved in an aqueous alkaline solution and a solution of a halogenated hydrocarbon having an aromatic dicarboxylic chloride component dissolved therein, are mixed. At that time, as a catalyst, a quaternary ammonium salt or a quaternary phosphonium salt may be present. The polymerization temperature is preferably within a range of from 0 to 40° C., and the polymerization time is preferably within a range of from 2 to 12 hours, in view of productivity. After the completion of the polymerization, an aqueous phase and an organic phase are separated, and a polymer dissolved in the organic phase is washed and recovered by a known method to obtain an aimed resin.

The alkali component used may, for example, be a hydroxide of an alkali metal such as sodium hydroxide or potassium hydroxide. The amount of the alkali component is preferably within a range of from 1.01 to 3 equivalent amount of the phenolic hydroxyl groups contained in the reaction system.

The halogenated hydrocarbon used may, for example, be dichloromethane, chloroform, 1,2-dichloroethane, trichloroethane, tetrachloroethane or dichlorobenzene.

The quaternary ammonium salt or the quaternary phosphonium salt used as the catalyst may, for example, be a salt such as hydrochloride, bromate or iodate of a tertiary alkyl amine such as tributylamine or trioctylamine, or benzyltriethylammonium chloride, benzyltrimethylammonium chloride, benzyltributylammonium chloride, tetraethylammonium chloride, tetrabutylammonium chloride, tetrabutylammonium bromide, trioctylmethylammonium chloride, tetrabutyl phosphonium bromide, triethyloctadecyl phosphonium bromide, N-laurylpyridinium chloride or laurylpicolinium chloride.

Further, at the time of polymerization, as a molecular weight modifier, an alkyl phenol such as phenol, o,m,p-cresol, o,m,p-ethylphenol, o,m,p-propylphenol, o,m,p-tert-butylphenol, pentylphenol, hexylphenol, octylphenol, nonylphenol, a 2,6-dimethylphenol derivative or a 2-methylphenol derivative; a monofunctional phenol such as o,m,p-phenylphenol; or a monofunctional acid halide such as acetyl chloride, butyryl chloride, octyl chloride, benzoyl chloride, benzenesulfonyl chloride, benzenesulfinyl chloride, sulfinyl chloride or benzene phosphonyl chloride, or a substituted product thereof, may be present. Among such molecular weight modifiers, preferred is a 2-methylphenol derivative in view of high molecular weight modifying property.

Specific examples of the 2-methylphenol derivative include o-cresol, 2,5-dimethylphenol, 2,3,5-trimethylphenol, 2,4,5-trimethylphenol, 2,3,4,5-tetramethylphenol, 2,5-dimethyl-4-t-butylphenol, 2,5-dimethyl-4-nonylphenol, 2,5-dimethyl-4-acetylphenol and α-tocopherol. Among them, preferred is 2,3,5-trimethylphenol in view of solution stability of the formed polymer.

In the polyester resin having a repeating structure comprising a residue represented by the formula (1) and a residue represented by the formula (2), which the photosensitive layer of the present invention has, groups present at the terminals of the molecular chain, such as groups derived from the above-described molecular weight modifier, are not included in the repeating units.

The viscosity-average molecular weight of the polyester resin having a repeating structure comprising a residue represented by the formula (1) and a residue represented by the formula (2), which the photosensitive layer of the present invention has, is usually at least 10,000, preferably at least 15,000, more preferably at least 20,000, and is usually at most 300,000, preferably at most 100,000, more preferably at most 50,000. If the viscosity-average molecular weight is less than 10,000, the mechanical strength of the resin tends to decrease, such being impractical, and if it is at least 300,000, coating in a proper thickness tends to be difficult.

(Electrophotographic Photoreceptor)

The above-described resin of the present invention is used for an electrophotographic photoreceptor, and is used as a binder resin in a photosensitive layer to be formed on an electroconductive substrate of the photoreceptor.

(Substrate)

As the electroconductive substrate, there are mainly used, for example, metallic materials such as aluminum, aluminum alloy, stainless steel, copper, and nickel, resin materials in which a conductive powder such as a metal, carbon, or tin oxide has been added for ensuring an electroconductivity, a resin, glass, or paper with a conductive material such as aluminum, nickel, or ITO (indium tin oxide) deposited or coated on its surface, or the like. They are used in drum form, sheet form, belt form, or the like. Alternatively, there may also be used the one obtained by coating a conductive material having an appropriate resistance value on an electroconductive substrate made of a metallic material for controlling the conductivity and the surface properties, or covering the defects.

When the metallic material such as an aluminum alloy is used as the electroconductive substrate, it may also be used after having undergone an anodic oxidation treatment, or a film formation treatment. When it is subjected to the anodic oxidation treatment, it is desirably subjected to a sealing treatment by a known method.

For example, the anodic oxidation treatment in an acidic bath of e.g. chromic acid, sulfuric acid, oxalic acid, boric acid or sulfamic acid forms an anodic oxide film, and an anodic oxidation treatment in sulfuric acid provides more preferred results. In the case of the anodic oxidation treatment in sulfuric acid, it is preferred that the sulfuric acid concentration is from 100 to 300 g/l, the dissolved aluminum concentration is from 2 to 15 g/l, the liquid temperature is from 15 to 30° C., the electrolysis voltage is from 10 to 20 V, and the current density is from 0.5 to 2 A/dm$^2$. However, the conditions are not limited to the above conditions.

It is preferred to subject the anodic oxide film thus formed to a sealing treatment. The sealing treatment may be carried out by a known method, and for example, a low temperature sealing treatment of immersing the film in an aqueous solution containing nickel fluoride as the main component or a high temperature sealing treatment of immersing the film in an aqueous solution containing nickel acetate as the main component is preferably carried out.

In the case of the above low temperature sealing treatment, the concentration of the aqueous nickel fluoride solution used may optionally be selected, and more preferred results will be obtained when it is within a range of from 3 to 6 g/l. Further, in order to smoothly carry out the sealing treatment, the treatment temperature is from 25 to 40° C., preferably from 30 to 35° C., and the pH of the aqueous nickel fluoride solution is from 4.5 to 6.5, preferably from 5.5 to 6.0. As a pH adjustor, oxalic acid, boric acid, formic acid, acetic acid, sodium hydroxide, sodium acetate, ammonium water or the like may be used. The treatment time is preferably from 1 to 3 minutes per 1 μm thickness of the film. Further, in order to further improve film physical properties, cobalt fluoride, cobalt acetate, nickel sulfate, a surfactant or the like may be preliminarily added to the aqueous nickel fluoride solution.

Then, washing with water and drying are carried out to complete the low temperature sealing treatment. In the case of the high temperature sealing treatment, as a sealing agent, an aqueous solution of a metal salt such as nickel acetate, cobalt acetate, lead acetate, nickel-cobalt acetate or barium nitrate may be used, and it is particularly preferred to use nickel acetate. In the case of using an aqueous nickel acetate solution, the concentration is preferably within a range of from 5 to 20 g/l. It is preferred to carry out the treatment at a treatment temperature of from 80 to 100° C., preferably from 90 to 98° C., and a pH of the aqueous nickel acetate solution of from 5.0 to 6.0. Here, as a pH adjustor, ammonia water, sodium acetate or the like may be used. The treatment time is at least 10 minutes, preferably at least 20 minutes. In this case also, in order to improve the film physical properties, sodium acetate, an organic carboxylic acid, an anionic or nonionic surfactant or the like may be added to the aqueous nickel acetate solution. Then, washing with water and drying are carried out to complete the high temperature sealing treatment. In a case of a thick average film thickness, stronger sealing conditions such as a high concentration of the sealing liquid and a treatment at a higher temperature for a longer time are required. Thus, not only the productivity tends to be poor but also surface defects such as stain, dirt or dust attachment are likely to occur. From such a viewpoint, the average film thickness of the anode oxide film is usually preferably at most 20 µm, particularly preferably at most 7 µm.

The substrate surface may be either smooth, or roughened by using a particular cutting method or carrying out a polishing treatment. Further, it may also be the one roughened by mixing particles with an appropriate particle size in the material constituting the substrate.

(Undercoat Layer)

An undercoat layer may be provided between the electroconductive substrate and the photosensitive layer for improving the adhesion, the blocking tendency, and the like.

The undercoat layer usable may be a resin, the one obtained by dispersing particles of a metal oxide or the like in a resin, and the like.

Examples of the metal oxide particles for use in the undercoat layer include particles of a metal oxide including one metallic element such as titanium oxide, aluminum oxide, silicon oxide, zirconium oxide, zinc oxide, or iron oxide; and particles of a metal oxide including a plurality of metallic elements such as calcium titanate, strontium titanate, and barium titanate. These particles may be used singly, or in mixture of a plurality thereof. Out of these metallic oxide particles, the titanium oxide and the aluminum oxide are preferred, and the titanium oxide is particularly preferred. The titanium oxide particles may be surface-treated by an inorganic substance such as tin oxide, aluminum oxide, antimony oxide, zirconium oxide or silicon oxide, or an organic substance such as stearic acid, polyol or silicone. Any crystalline form of the titanium oxide particles such as rutile-, anatase-, brookite-, or amorphous-form may be used. A plurality of crystalline forms may also be included therein.

Further, although the particle size of the metal oxide particles usable may be various ones, among them, it is preferably at least 10 nm and at most 100 nm, and in particular, it is preferably at least 10 nm and at most 50 nm as the average primary particle size in view of the characteristics and the solution stability.

The undercoat layer is desirably formed into the structure in which the metal oxide particles are dispersed in the binder resin. Examples of the binder resin for use in the undercoat layer include phenoxy, epoxy, polyvinylpyrrolidone, polyvinyl alcohol, casein, polyacrylic acid, celluloses, gelatin, starch, polyurethane, polyimide, and polyamide, and they can be used respectively alone, or in a cured form with a curing agent. Among them, alcohol-soluble copolymerized polyamide, modified polyamide, or the like is preferred in that it exhibits good dispersibility and coating property.

The mixture ratio of the inorganic particles to the binder resin can be optionally selected, but it is preferably in the range of from 10 to 500 wt % in view of the stability and the coating property of the dispersion.

The film thickness of the undercoat layer can be optionally selected, but it is preferably from 0.1 µm to 20 µm in view of the photoreceptor characteristics and the coating property. Further, a known antioxidant or the like may also be added to the undercoat layer.

(Charge Generation Layer)

In the case where the electrophotographic photoreceptor of the present invention is a lamination type photoreceptor, examples of the charge generation material to be used for the charge generation layer include selenium and alloys thereof, cadmium sulfide, and other inorganic photoconductive materials, and various photoconductive materials including organic pigments such as phthalocyanine pigments, azo pigments, quinacridone pigments, indigo pigments, perylene pigments, polycyclic quinone pigments, anthanthrone pigments, and benzimidazole pigments. The organic pigments are particularly preferred, and phthalocyanine pigments and azo pigments are more preferred. The fine particles of these charge generation materials are bound by various binder resins such as polyester resin, polyvinyl acetate, polyacrylic acid ester, polymethacrylic acid ester, polyester, polycarbonate, polyvinyl acetoacetal, polyvinyl propional, polyvinyl butyral, phenoxy resin, epoxy resin, urethane resin, cellulose ester, and cellulose ether to be used. The amount of the charge generation material to be used in this case is in the range of from 30 to 500 parts by weight per 100 parts by weight of the binder resin, and the film thickness of the charge generation layer is generally from 0.1 µm to 1 µm, preferably from 0.15 µm to 0.6 µm.

When a phthalocyanine compound is used as the charge generation material, specifically, metal-free phthalocyanine and phthalocyanines in which metals such as copper, indium, gallium, tin, titanium, zinc, vanadium, silicon, and germanium, or oxides thereof, halides thereof, or the like are coordinated are used. Examples of a ligand to a trivalent or higher valent metal atom include the above mentioned oxygen atom and chlorine atom, and a hydroxyl group and an alkoxy group. In particular, high-sensitivity X-form, and τ-form metal-free phthalocyanines, A-form, B-form, D-form, or the like of titanyl phthalocyanine, vanadyl phthalocyanine, chloroindium phthalocyanine, chlorogallium phthalocyanine, hydroxygallium phthalocyanine, and the like are preferred. Incidentally, out of the crystal forms of titanyl phthalocyanine herein cited, the A-, and B-forms are referred to as I-, and II-phases, respectively by W. Hellers, et al. (Zeit. Kristallogr. 159 (1982) 173), and the A-form is known as the stable form. The D-form is the crystal form characterized in that a distinct peak is shown at a diffraction angle 2θ±0.2° of 27.3° in a powder X-ray diffraction using a CuKα ray. The phthalocyanine compounds may be used singly, or in mixture of some thereof. The phthalocyanine compounds herein used or the ones in crystal form in a mixed state may be obtained by mixing respective constituents afterwards, or by causing the mixed state in the manufacturing and treatment process of the phthalocyanine compound, such as synthesis, formation into pigment, crystallization, or the like. As such treatment, an acid paste treatment, a grinding treatment, a solvent treatment, or the like is known.

(Charge Transport Layer)

Examples of the charge transport material contained in the charge transport layer include electron-withdrawing substances including aromatic nitro compounds such as 2,4,7-trinitrofluorenone, cyano compounds such as tetracyanoquinodimethane, and quinones such as diphenoquinone, and electron donating substances including heterocyclic compounds such as carbazole derivatives, indole derivatives, imidazole derivatives, oxazole derivatives, pyrazole derivatives, oxadiazole derivatives, pyrazoline derivatives, and thiadiazole derivatives, aniline derivatives, hydrazone compounds, aromatic amine derivatives, stilbene derivatives, butadiene derivatives, and enamine compounds, and the ones obtained by combining a plurality of the compounds, and polymers having a group comprising these compounds at its main chain or side chain. Among them, carbazole derivatives, hydrazone derivatives, aromatic amine derivatives, stilbene derivatives, and butadiene derivatives, and the ones obtained by combining a plurality of the derivatives are preferred, and the ones obtained by combining a plurality of aromatic amine derivatives, stilbene derivatives, and butadiene derivatives, are particularly preferred. Specifically, one having a structure represented by the following formula (7) is preferably used:

pentyl group or a cyclohexyl group, and among them, a $C_{1-6}$ alkyl group is preferred. The alkyl group having an aryl group as the substituent may, for example, be a benzyl group or a phenethyl group, and a $C_{7-12}$ aralkyl group is preferred.

Further, the aryl group may, for example, be a phenyl group, a tolyl group, a xylyl group, a naphthyl group or a pyrenyl group, and a $C_{6-12}$ aryl group is preferred.

Further, the heterocyclic group is preferably a heterocyclic ring having aromaticity, and it may, for example, be a furyl group, a thienyl group or a pyridyl group, and a monocyclic aromatic heterocyclic ring is more preferred.

Further, each of $R^6$ to $R^{13}$ is most preferably a methyl group or a phenyl group.

In the formula (7), each $Ar^1$ to $Ar^4$ which are independent of one another, represents an arylene group which may have a substituent or a bivalent heterocyclic group which may have a substituent. Each of $m^1$ and $m^2$ which are independent of each other, represents 0 or 1. Each of $Ar^5$ when $m^1=0$ and $Ar^6$ when $m^2=0$ represents an alkyl group which may have a substituent, an aryl group which may have a substituent, or a monovalent heterocyclic group which may have a substituent. Each of $Ar^5$ when $m^1=1$ and $Ar^6$ when $m^2=1$ represents an alkylene group which may have a substituent, an arylene group which may have a substituent, or a bivalent heterocyclic group which may have a substituent. The aryl group may, for example, be a phenyl group, a tolyl group, a xylyl group,

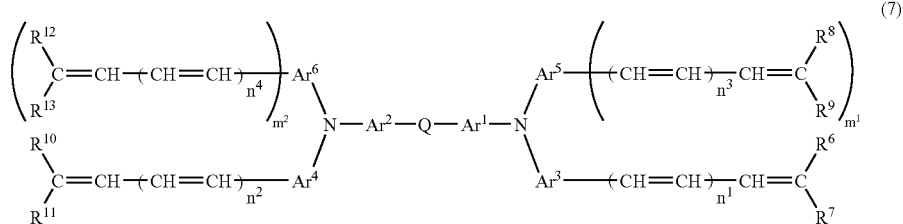

(7)

in the formula (7), each of $Ar^1$ to $Ar^4$ which are independent of one another, represents an arylene group which may have a substituent, or a bivalent heterocyclic group which may have a substituent, each of $m^1$ and $m^2$ which are independent of each other, represents 0 or 1, each of $Ar^5$ when $m^1=0$ and $Ar^6$ when $m^2=0$ represents an alkyl group which may have a substituent, an aryl group which may have a substituent, or a monovalent heterocyclic group which may have a substituent, each of $Ar^5$ when $m^1=1$ and $Ar^6$ when $m^2=1$ represents an alkylene group which may have a substituent, an arylene group which may have a substituent, or a bivalent heterocyclic group which may have a substituent, Q represents a direct bond or a bivalent residue, each of $R^6$ to $R^{13}$ which are independent of one another, represents a hydrogen atom, an alkyl group which may have a substituent, an aryl group which may have a substituent, or a heterocyclic group which may have a substituent, each of $n^1$ to $n^4$ which are independent of one another, represents an integer of from 0 to 4, provided that $Ar^1$ to $Ar^6$ may be mutually bonded to form a cyclic structure.

In the formula (7), each of $R^6$ to $R^{13}$ which are independent of one another, represents a hydrogen atom, an alkyl group which may have a substituent, an aryl group which may have a substituent, an aralkyl group which may have a substituent, or a heterocyclic group which may have a substituent.

The alkyl group may, for example, be a methyl group, an ethyl group, a propyl group, an isopropyl group, a butyl group, a pentyl group, a hexyl group, a heptyl group, a cycloa naphthyl group or a pyrenyl group, and it is preferably a $C_{6-14}$ aryl group; the arylene group may, for example, be a phenylene group or a naphthylene group, and it is preferably a phenylene group; the monovalent heterocyclic group is preferably a heterocyclic ring having aromaticity, it may, for example, be a furyl group, a thienyl group or a pyridyl group, and it is more preferably a monocyclic aromatic heterocyclic ring; and the bivalent heterocyclic group is preferably a heterocyclic ring having aromaticity, it may, for example, be a pyridylene group or a thienylene group, and it is more preferably a monocyclic aromatic heterocyclic ring.

Among them, most preferably, each of $A^1$ and $Ar^2$ is a phenylene group, and each of $Ar^5$ and $Ar^6$ is a phenyl group.

Among groups represented by $R^6$ to $R^{13}$ and $Ar^1$ to $Ar^6$, the alkyl group, the aryl group, the aralkyl group and the heterocyclic group may further have a substituent, and the substituent may, for example, be a cyano group; a nitro group; a hydroxyl group; a halogen atom such as a fluorine atom, a chlorine atom, a bromine atom or an iodine atom; an alkyl group such as a methyl group, an ethyl group, a propyl group, an isopropyl group, a butyl group, an isobutyl group, a s-butyl group, a t-butyl group, a pentyl group, a hexyl group, a cyclopentyl group or a cyclohexyl group; an alkoxy group such as a methoxy group, an ethoxy group or a propyloxy group; an alkylthio group such as a methylthio group or an ethylthio group; an alkenyl group such as a vinyl group or an allyl group; an aralkyl group such as a benzyl group, a naphthyl-methyl group or a phenethyl group; an aryloxy group such as a phenoxy group or a tolyloxy group; an arylalkoxy group such as a benzyloxy group or a phenethyloxy group; an aryl group such as a phenyl group or a naphthyl group; an arylvinyl group such as a styryl group or a naphthylvinyl group; an acyl group such as an acetyl group or a benzoyl group; a dialkylamino group such as a dimethylamino group or a diethylamino group; a diarylamino group such as a diphenylamino group or a dinaphthylamino group; a diheterocycle amino group such as a diaralkylamino group such as a dibenzylamino group or a diphenethylamino group, a dipyridylamino group or a dithienylamino group; or a diallylamino group, or a substituted amino group in combination of the above substituents of the amino groups, such as a di-substituted amino group.

Further, these substituents may be bonded to each other to form a cyclic hydrocarbon group or a heterocyclic group by means of a single bond, a methylene group, an ethylene group, a carbonyl group, a vinylidene group, an ethylenylene group, or the like.

Among them, as preferred substituents, a halogen atom, a cyano group, a hydroxyl group, a $C_{1-6}$ alkyl group, a $C_{1-6}$ alkoxy group, a $C_{1-6}$ alkylthio group, a $C_{6-12}$ aryloxy group, a $C_{6-12}$ arylthio group and a $C_{2-8}$ dialkylamino group may be mentioned. A halogen atom, a $C_{1-6}$ alkyl group and a phenyl group are more preferred, and a methyl group and a phenyl group are particularly preferred.

In the formula (7), each of $n^1$ to $n^4$ which are independent of one another, represents an integer of from 0 to 4, and preferably from 0 to 2, particularly preferably 1. Each of $m^1$ and $m^2$ represents 0 or 1, preferably 0.

In the formula (7), Q represents a direct bond or a bivalent residue, and as the preferred bivalent residue, a Group XVI atom, an alkylene group which may have a substituent, an arylene group which may have a substituent, a cycloalkylidene group which may have a substituent or one having these groups bonded to each other, such as [—O-Z-O—], [-Z-O-Z-], [—S-Z-S—] or [-Z-Z-] (wherein O represents an oxygen atom, S represents a sulfur atom, and Z represents an arylene group which may have a substituent or an alkylene group which may have a substituent), may be mentioned.

The alkylene group constituting Q is preferably one having a carbon number of from 1 to 6, particularly preferably a methylene group or an ethylene group. Further, the cycloalkylidene group is preferably one having a carbon number of from 5 to 8, more preferably a cyclopentylidene group or a cyclohexylidene group. The arylene group is preferably one having a carbon number of from 6 to 14, particularly preferably a phenylene group or a naphthylene group.

Further, these alkylene group, arylene group and cycloalkylidene groups may have a substituent, and as preferred substituents, a hydroxyl group, a nitro group, a cyano group, a halogen atom, a $C_{1-6}$ alkyl group, a $C_{1-6}$ alkenyl group and a $C_{6-14}$ aryl group may be mentioned.

Specific charge transport materials which the electrophotographic photoreceptor of the present invention may have, may be arylamine type compounds disclosed in JP-A-9-244278 and arylamine type compounds disclosed in JP-A-2002-275133.

These charge transport materials may be used alone or in combination as a mixture. Such a charge transport material is bonded to the binder resin to form the charge transport layer. The charge transport layer may be composed of a single layer or may be a laminate of a plurality of layers having different constituents or different compositions.

As for the ratio of the binder resin to the charge transport material, the charge transport material is used in an amount of, generally from 30 to 200 parts by weight, preferably from 40 to 150 parts by weight, per 100 parts by weight of the binder resin. Further, the film thickness is generally from 5 to 50 μm, preferably from 10 to 45 μm.

The charge transport layer may contain additives such as known plasticizers, antioxidants, ultraviolet absorbers, electron-withdrawing compounds, dyes, pigments and leveling agents for improving the film-forming properties, flexibility, coating property, stain resistance, gas resistance, light fastness, and the like.

Examples of the antioxidant include a hindered phenol compound and a hindered amine compound. Further, examples of the dye and the pigment include various colorant compounds and azo compounds.

(Dispersion Type (Monolayer Type) Photosensitive Layer)

In the case of the dispersion type photosensitive layer, the above-described charge generation material is dispersed in the charge transport medium having the above compounding ratio.

The particle size of the charge generation material to be used in such a case is required to be sufficiently small, and it is preferably 1 μm or less, and more preferably 0.5 μm or less. If the amount of the charge generation material to be dispersed in the photosensitive layer is too small, sufficient sensitivity cannot be obtained. Whereas, if it is too much, there occur detrimental effects such as a reduction in the triboelectricity, a reduction in the sensitivity, and the like. Accordingly, the charge generation material is used preferably in the range of from 0.5 to 50 wt %, more preferably in the range of from 1 to 20 wt %.

The film thickness of the photosensitive layer to be used is generally from 5 to 50 μm, and preferably from 10 to 45 μm. It is also acceptable in this case that there are added therein known plasticizers for improving the film-forming properties, flexibility, mechanical strength, and the like, additives for controlling the residual potential, dispersant aids for improving the dispersion stability, leveling agents for improving the coating properties, surfactants, for example, a silicone oil, a fluorine-based oil, and other additives.

A protective layer may also be provided on the photosensitive layer for a purpose of preventing the wear of the photosensitive layer, or preventing or reducing the deterioration of the photosensitive layer due to the discharge product or the like arising from a charger or the like.

Further, the surface layer thereof may also contain fluorine-based resins, silicone resins, and the like for a purpose of reducing the frictional resistance or the abrasion on the surface of the photoreceptor. Further, it may also contain particles comprising these resins, or particles of inorganic compounds.

(Layer Formation Method)

Each of the layers constituting the photoreceptor is formed by coating the substrate by means of e.g. dip coating, spray coating, nozzle coating, bar coating, roll coating or blade coating, which is known as a method for forming a photosensitive layer of an electrophotographic photoreceptor. Among them, dip coating is preferred in view of high productivity, but the method is not limited to dip coating.

As the method of forming each layer, a known method wherein materials to be contained in the layer are dissolved or dispersed in a solvent to obtain coating liquids, which are sequentially coated, may be employed.

(Image Forming Apparatus)

Now, the embodiment of an image forming apparatus employing the electrophotographic photoreceptor of the present invention will be explained with reference to FIG. 1 illustrating the essential structure of the apparatus. However, the embodiment is not limited to the following explanation, and various changes and modifications can be made without departing from the spirit and scope of the present invention.

As shown in FIG. 1, the image forming apparatus comprises an electrophotographic photoreceptor 1, a charging apparatus 2, an exposure apparatus 3 and a developing apparatus 4, and it further has a transfer apparatus 5, a cleaning apparatus 6 and a fixing apparatus 7 as the case requires.

The electrophotographic photoreceptor 1 is not particularly limited so long as it is the above-described electrophotographic photoreceptor of the present invention, and in FIG. 1, as one example thereof, a drum form photoreceptor comprising a cylindrical electroconductive substrate and the above-described photosensitive layer formed on the surface of the substrate. Along the outer peripheral surface of the electrophotographic photoreceptor 1, the charging apparatus 2, the exposure apparatus 3, the developing apparatus 4, the transfer apparatus 5 and the cleaning apparatus 6 are disposed.

The charging apparatus 2 is to charge the electrophotographic photoreceptor 1, and uniformly charges the surface of the electrophotographic photoreceptor 1 to a predetermined potential. In FIG. 1, as one example of the charging apparatus 2, a roller type charging apparatus (charging roller) is shown, and in addition, a corona charging apparatus such as corotron or scorotron, a contact charging apparatus such as a charging brush, and the like are popularly used.

The electrophotographic photoreceptor 1 and the charging apparatus 2 are designed to be removable from the main body of the image forming apparatus, in the form of a cartridge comprising both (hereinafter optionally referred to as a photoreceptor cartridge) in many cases. And when the electrophotographic photoreceptor 1 or the charging apparatus 2 is deteriorated for example, the photoreceptor cartridge can be taken out from the main body of the image forming apparatus and another new photoreceptor cartridge can be attached to the main body of the image forming apparatus. Further, the toner as described hereinafter is stored in a toner cartridge and is designed to be removable from the main body of the image forming apparatus in many cases, and when the toner in the toner cartridge used is consumed, the toner cartridge can be taken out from the main body of the image forming apparatus, and another new toner cartridge can be attached. Further, a cartridge comprising all the electrophotographic photoreceptor 1, the charging apparatus 2 and the toner may be used in some cases.

The type of the exposure apparatus 3 is not particularly limited so long as the electrophotographic photoreceptor 1 is exposed to form an electrostatic latent image on the photosensitive surface of the electrophotographic photoreceptor 1. Specific examples thereof include a halogen lamp, a fluorescent lamp, a laser such as a semiconductor laser or a He—Ne laser and LED. Further, exposure may be carried out by a photoreceptor internal exposure method. The light for the exposure is optional, and exposure may be carried out with a monochromatic light having a wavelength of 780 nm, a monochromatic light slightly leaning to short wavelength side having a wavelength of from 600 nm to 700 nm, a short wavelength monochromatic light having a wavelength of from 380 nm to 500 nm or the like.

The type of the developing apparatus 4 is not particularly limited, and an optional apparatus of e.g. a dry development method such as cascade development, single component conductive toner development or two component magnetic brush development or a wet development method may be used. In FIG. 1, the developing apparatus 4 comprises a developing tank 41, an agitator 42, a supply roller 43, a developing roller 44 and a control member 45, and a toner T is stored in the developing tank 41. Further, as the case requires, the developing apparatus 4 may have a supply apparatus (not shown) which supplies the toner T. The supply apparatus is constituted so that the toner T can be supplied from a container such as a bottle or a cartridge.

The supply roller 43 is formed from e.g. an electrically conductive sponge. The developing roller 44 is a metal roll of e.g. iron, stainless steel, aluminum or nickel or a resin roll having such a metal roll covered with a silicon resin, a urethane resin, a fluororesin or the like. A smoothing treatment or a roughening treatment may be applied to the surface of the developing roller 44 as the case requires.

The developing roller 44 is disposed between the electrophotographic photoreceptor 1 and the supply roller 43, and is in contact with each of the electrophotographic photoreceptor 1 and the supply roller 43. The supply roller 43 and the developing roller 44 are rotated by a rotation driving mechanism (not shown). The supply roller 43 supports the stored toner T and supplies it to the developing roller 44. The developing roller 44 supports the toner T supplied by the supply roller 43 and brings it into contact with the surface of the electrophotographic photoreceptor 1.

The control member 45 is formed by a resin blade of e.g. a silicon resin or a urethane resin, a metal blade of e.g. stainless steel, aluminum, copper, brass or phosphor bronze, or a blade having such a metal blade covered with a resin. The control member 45 is in contact with the developing roller 44, and is pressed under a predetermined force to the side of the developing roller 44 by e.g. a spring (general blade linear pressure is from 5 to 500 g/cm). As the case requires, the control member 45 may have a function to charge the toner T by means of frictional electrification with the toner T.

The agitator 42 is rotated by a rotation driving mechanism, and stirs the toner T and transports the toner T to the supply roller 43. A plurality of agitators 42 with different blade shapes or sizes may be provided.

The type of the toner T is optional, and in addition to a powdery toner, a polymerized toner obtained by means of e.g. suspension polymerization or emulsion polymerization, and the like, may be used. Particularly when a polymerized toner is used, preferred is one having small particle sizes of from about 4 to about 8 μm. Further, with respect to the shape of particles of the toner, nearly spherical particles and particles which are not spherical, such as potato-shape particles, may be variously used. The polymerized toner is excellent in charging uniformity and transfer properties, and is favorably used to obtain a high quality image.

The type of the transfer apparatus 5 is not particularly limited, and an apparatus of optional method such as an electrostatic transfer method such as corona transfer, roller transfer or belt transfer, a pressure transfer method or an adhesive transfer method may be used. In this case, the transfer apparatus 5 comprises a transfer charger, a transfer roller, a transfer belt and the like which are disposed to face the electrophotographic photoreceptor 1. The transfer apparatus 5 applies a predetermined voltage (transfer voltage) at a polarity opposite to the charge potential of the toner T and transfers a toner image formed on the electrophotographic photoreceptor 1 to a recording paper (paper sheet, medium) P.

The cleaning apparatus 6 is not particularly limited, and an optional cleaning apparatus such as a brush cleaner, a magnetic brush cleaner, an electrostatic brush cleaner, a magnetic roller cleaner or a blade cleaner may be used. The cleaning apparatus 6 is to scrape away the remaining toner attached to the photoreceptor 1 by a cleaning member and to recover the remaining toner. If there is no or little remaining toner, the cleaning apparatus 6 is not necessarily provided.

The fixing apparatus 7 comprises an upper fixing member (fixing roller) 71 and a lower fixing member (fixing roller) 72, and a heating apparatus 73 is provided in the interior of the fixing member 71 or 72. FIG. 1 illustrates an example wherein the heating apparatus 73 is provided in the interior of the upper fixing member 71. As each of the upper and lower fixing members 71 and 72, a known heat fixing member such as a fixing roll comprising a metal cylinder of e.g. stainless steel or aluminum covered with a silicon rubber, a fixing roll further covered with a fluororesin or a fixing sheet may be used. Further, each of the fixing members 71 and 72 may have a structure to supply a release agent such as a silicone oil so as to improve the releasability, or may have a structure to forcibly apply a pressure to each other by e.g. a spring.

The toner transferred on the recording paper P is heated to a molten state when it passes through the upper fixing member 71 and the lower fixing member 72 heated to a predetermined temperature, and then cooled after passage and fixed on the recording paper P.

The type of the fixing apparatus is also not particularly limited, and one used in this case, and further, a fixing apparatus by an optional method such as heated roller fixing, flash fixing, oven fixing or pressure fixing may be provided.

In the electrophotographic apparatus constituted as mentioned above, recording of an image is carried out as follows. Namely, the surface (photosensitive surface) of the photoreceptor 1 is charged to a predetermined potential (−600 V for example) by the charging apparatus 2. In this case, it may be charged by a direct voltage or may be charged by superposing an alternating voltage to a direct voltage.

Then, the charged photosensitive surface of the photoreceptor 1 is exposed by means of the exposure apparatus 3 in accordance with the image to be recorded to form an electrostatic latent image on the photosensitive surface. Then, the electrostatic latent image formed on the photosensitive surface of the photoreceptor 1 is developed by a developing apparatus 4.

The developing apparatus 4 forms the toner T supplied by the supply roller 43 into a thin layer by the control member (developing blade) 45 and at the same time, charges the toner T to a predetermined polarity (in this case, the same polarity as the charge potential of the photoreceptor 1 and negative polarity) by means of frictional electrification, transfers it while supporting it by the developing roller 44 and brings it into contact with the surface of the photoreceptor 1.

When the charged toner T supported by the developing roller 44 is brought into contact with the surface of the photoreceptor 1, a toner image corresponding to the electrostatic latent image is formed on the photosensitive surface of the photoreceptor 1. Then, the toner image is transferred to the recording paper P by the transfer apparatus 5. Then, the toner remaining on the photosensitive surface of the photoreceptor 1 without being transferred is removed by the cleaning apparatus 6.

After the toner image is transferred to the recording paper P, the recording paper P is made to pass through the fixing apparatus 7 so that the toner image is heat fixed on the recording paper P, whereby an image is finally obtained.

The image forming apparatus may have a structure capable of carrying out a charge removal step in addition to the above-described structure. The charge removal step is a step of carrying out charge removal of the electrophotographic photoreceptor by exposing the electrophotographic photoreceptor, and as a charge removal apparatus, a fluorescent lamp or LED may, for example, be used. Further, the light used in the charge removal step, in terms of intensity, is a light having an exposure energy at least three times the exposure light in many cases.

Further, the image forming apparatus may have a further modified structure, and it may have, for example, a structure capable of carrying out a step such as a pre-exposure step or a supplementary charging step, a structure of carrying out offset printing or a full color tandem structure employing plural types of toners.

EXAMPLES

Now, the present invention will be explained in further detail with reference to Preparation Examples, Examples and Comparative Examples. However, the present invention is by no means restricted to the production methods in the following Preparation Examples.

(Preparation of Resin)

(Viscosity-average Molecular Weight)

A resin was dissolved in dichloromethane to prepare a solution with a concentration C of 6.00 g/L. By using an Ubbellohde capillary viscometer whereby the falling time $t_0$ of a solvent (dichloromethane) is 136.16 seconds, the falling time t of a sample solution in a thermobath set at 20.0° C. was measured. The viscosity-average molecular weight Mv was calculated in accordance with the following equation.

$a = 0.438 \times \eta_{sp} + 1 \; \eta_{sp} t/t_0 - 1$ $b = 100 \times \eta_{sp}/C \; C = 6.00 \; (g/L)$ $\eta = b/a$ $Mv = 3207 \times \eta^{1.205}$ Preparation Example 1

Preparation of Resin A of Example 1

Sodium hydroxide (25.06 g) and demineralized water (845 ml) were weighed out in a 1 liter (L) beaker, and dissolved with stirring. To this solution, 1,1-bis(4-hydroxy-3-methylphenyl)ethane (hereinafter sometimes referred to as BPOCE) (57.25 g) was added, stirred and dissolved, and the resulting alkaline aqueous solution was transferred in a 1 L reaction tank. Then, benzyltriethylammonium chloride (0.6258 g) and 2,3,6-trimethylphenol (1.1904 g) were sequentially added to the reaction bath.

Separately, a mixed solution of terephthalic acid chloride (48.91 g) and dichloromethane (423 ml) was transferred into a dropping funnel.

While keeping the external temperature of the polymerization tank at 20° C., and stirring the alkaline aqueous solution in the reaction tank, the dichloromethane solution was dropwise added thereto from the dropping funnel over 1 hour. Stirring was further continued for 5 hours, and then dichloromethane (700 ml) was added thereto, and stirring was continued for 2 hours. Then, acetic acid (9.09 ml) was added thereto, followed by stirring for 30 minutes, and then stirring was stopped, and an organic layer was separated. The organic layer was washed with a 0.1 N sodium hydroxide aqueous solution (850 ml) two times, and then washed with a 0.1 N hydrochloric acid (850 ml) two times, and further washed with demineralized water (850 ml) two times.

The precipitate obtained by pouring the organic layer after washing into methanol (5,600 ml) was taken out by filtration, and dried to obtain an aimed resin A. The viscosity-average molecular weight of the obtained resin A was 54,200. The structural formula is shown below.

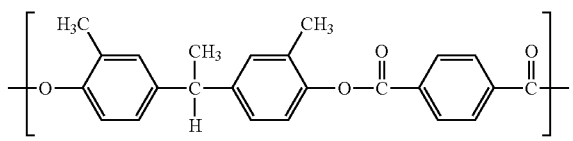

Preparation Example 2

Preparation of Resin B of Example 2

Sodium hydroxide (12.76 g) and demineralized water (423 ml) were weighed out in a 1L beaker, and dissolved with stirring. To this solution, BPOCE (14.58 g) and bis(4-hydroxy-3-methylphenyl)methane (hereinafter sometimes referred to as BPOCF) (13.74 g) were added, dissolved with stirring, and the resulting alkaline aqueous solution was transferred into a 1 L reaction bath. Then, benzyltriethylammonium chloride (0.3188 g) and 2,3,6-trimethylphenol (0.6063 g) were sequentially added to the reaction bath.

Separately, a mixed solution of terephthalic acid chloride (24.91 g) and dichloromethane (211 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was continued for 2 hours. Then, acetic acid (4.63 ml) was added thereto, followed by stirring for 30 minutes, and then stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (2,800 ml) was taken out by filtration, and dried to obtain an aimed resin B. The viscosity-average molecular weight of the obtained resin B was 66,400. The structural formula is shown below:

The numerical value after each repeating structure represents the molar ratio.

Preparation Example 3

Preparation of Resin C of Example 3

Sodium hydroxide (13.80 g) and demineralized water (423 ml) were weighed out in a 1 L beaker, and dissolved with stirring. To this solution, 1,1-bis(4-hydroxyphenyl)ethane (hereinafter sometimes referred to as BPE) (13.94 g) and a mixture of bis(4-hydroxyphenyl)methane (hereinafter sometimes referred to as p,p'-BPF), (2-hydroxyphenyl)(4-hydroxyphenyl)methane (hereinafter sometimes referred to as o,p'-BPF) and bis(2-hydroxymethylphenyl)methane (hereinafter sometimes referred to as o,o'-BPF) (BPF-D, manufactured by HONSHU CHEMICAL INDUSTRY CO., LTD., mixture ratio p,p'-BPF:o,p'-PBF:o,o'-BPF=about 35:48:17) (13.03 g) were added, dissolved with stirring, and the resulting alkaline aqueous solution was transferred into a 1 L reaction bath. Then, benzyltriethylamonium chloride (0.3446 g) and 2,3,6-trimethylphenol (0.6555 g) were sequentially added to the reaction bath.

Separately, a mixed solution of terephthalic acid chloride (26.93 g) and dichloromethane (211 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was continued for 2 hours. Then, acetic acid (5.00 ml) was added thereto, followed by stirring for 30 minutes, and then stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (2,800 ml) was taken out by filtration, and dried to obtain an aimed resin C. The viscosity-average molecular weight of the obtained resin C was 32,900. The structural formula is shown below:

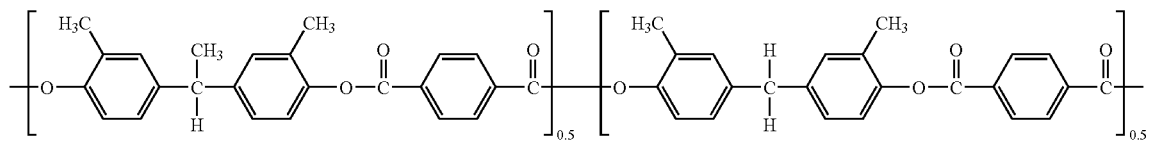

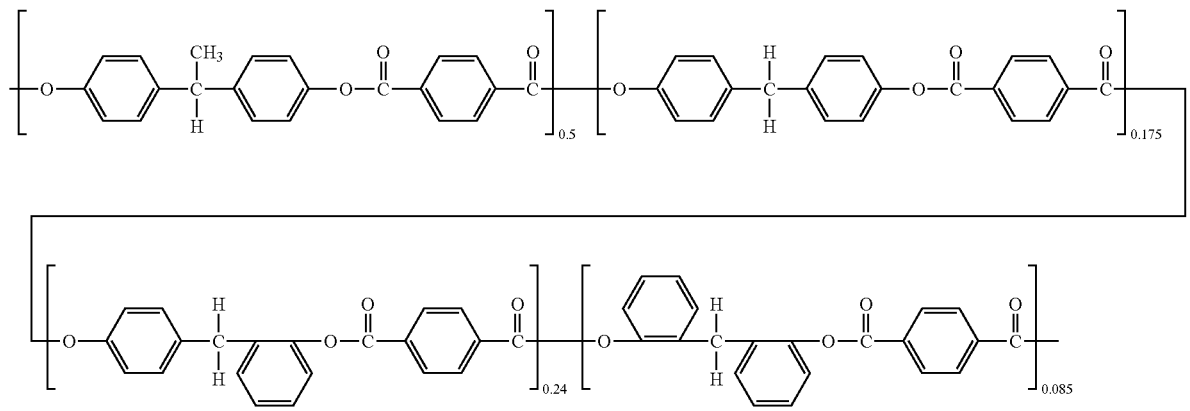

The numerical value after each repeating structure represents the molar ratio.

Preparation Example 4

Preparation of Resin D of Example 4

Sodium hydroxide (25.92 g) and demineralized water (845 ml) were weighed out in a 1 L beaker, and dissolved with stirring. To this solution, BPOCE (41.45 g) and a mixture of p,p'-BPF and o,p'-BPF (mixture ratio p,p'-BPF:o,p'-PBF=about 40:60) (14.68 g) were added, stirred and dissolved, and the resulting alkaline aqueous solution was transferred into a 1 L reaction bath. Then, benzyltriethylamonium chloride (0.6473 g) and 2,3,5-trimethylphenol (1.2311 g) were sequentially added to the reaction bath.

Separately, a mixed solution of terephthalic acid chloride (50.59 g) and dichloromethane (423 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (700 ml) was added thereto, and stirring was continued for 5 hours. Then, acetic acid (9.40 ml) was added thereto, followed by stirring for 30 minutes, and then stirring was stopped, and an organic layer was separated. The organic layer was washed with a 0.1 N sodium hydroxide aqueous solution (850 ml) two times, and then washed with a 0.1 N hydrochloric acid (850 ml) two times, and further washed with demineralized water (850 ml) two times.

The precipitate obtained by pouring the organic layer after washing into methanol (5,600 ml) was taken out by filtration, and dried to obtain an aimed resin D. The viscosity-average molecular weight of the obtained resin D was 44,800. The structural formula is shown below:

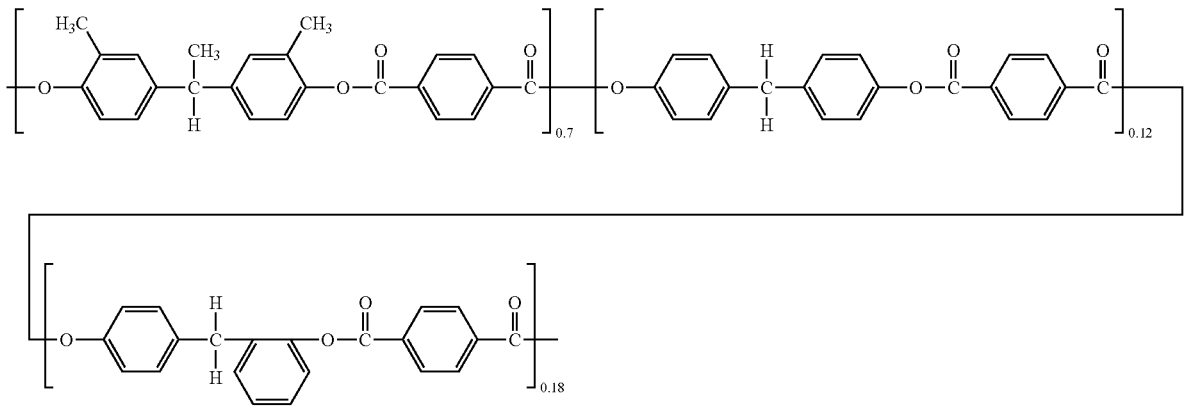

The numerical value after each repeating structure represents the molar ratio.

Preparation Example 5

Preparation of resin E of Example 5

Sodium hydroxide (27.22 g) and demineralized water (845 ml) were weighed out in a 1 L beaker, and dissolved with stirring. To the resulting solution, BPOCE (18.91 g) and a mixture of p,p'-BPF, o,p'-BPF and o,o'-BPF (BPF-D, manufactured by HONSHU CHEMICAL INDUSTRY CO., LTD., mixture ratio p,p'-BPF:o,p'-PBF:o,o'-BPF=about 35:48:17) (36.46 g) were added, stirred and dissolved, and the resulting alkaline aqueous solution was transferred into a 1 L reaction bath. Then, benzyltriethylamonium chloride (0.6710 g) and 2,3,5-trimethylphenol (0.3542 g) were sequentially added to the reaction bath.

Separately, a mixed solution of terephthalic acid chloride (53.13 g) and dichloromethane (423 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (700 ml) was added, and stirring was continued for 5 hours. Then, acetic acid (9.87 ml) was added thereto, followed by stirring for 30 minutes, and then stirring was stopped, and an organic layer was separated. The organic layer was washed with a 0.1 N sodium hydroxide aqueous solution (850 ml) two times, and then washed with a 0.1 N hydrochloric acid (850 ml) two times, and further washed with demineralized water (850 ml) two times.

The precipitate obtained by pouring the organic layer after washing into methanol (5,600 ml) was taken out by filtration, and dried to obtain an aimed resin E. The viscosity-average molecular weight of the obtained resin E was 59,600. The structural formula is shown below:

tinued for 2 hours. Then, acetic acid (9.09 ml) was added thereto, followed by stirring for 30 minutes. Then, stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (2,800 ml) was taken out by filtration, and dried to obtain an aimed resin F. The viscosity-average molecular weight of the obtained resin F was 52,400. The structural formula is shown below:

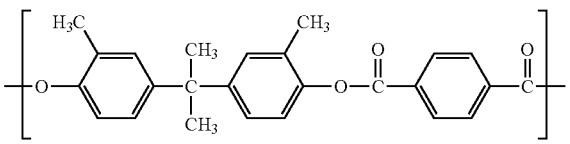

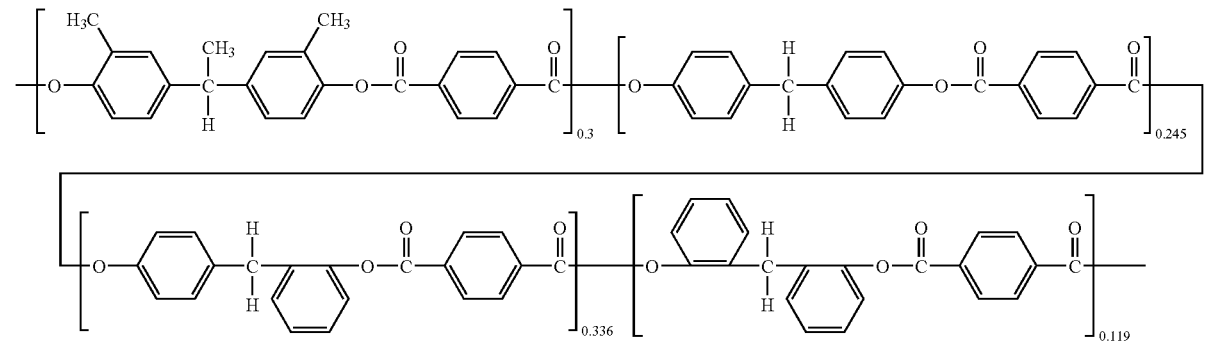

The numerical value after each repeating structure represents the molar ratio.

Preparation Example 6

Preparation of Resin F of Comparative Example 1

Sodium hydroxide (12.08 g) and demineralized water (423 ml) were weighed out in a 1 L beaker, and dissolved with stirring. To the obtained solution, 2,2-bis(4-hydroxy-3-methylphenyl)propane (hereinafter sometimes referred to as BPC) (29.20 g) were added, stirred and dissolved, and then the resulting alkaline aqueous solution was transferred into a 1 L reaction bath. Then, benzyltriethylammonium chloride (0.3018 g) and 2,3,6-trimethylphenol (0.5741 g) were sequentially added to the reaction bath.

Separately, a mixed solution of terephthalic acid chloride (23.59 g) and dichloromethane (211 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was con- Preparation Example 7

Preparation of Resin G of Comparative Example 2

Sodium hydroxide (15.04 g) and demineralized water (1122 ml) were weighed out in a 1 L beaker, and dissolved with stirring. To the obtained solution, 2,2-bis(4-hydroxyphenyl)propane (hereinafter sometimes referred to as BPA) (16, 32 g) and a mixture of p,p'-BPF, o,p'-BPF and o,o'-BPF (BPF-D, manufactured by HONSHU CHEMICAL INDUSTRY CO., LTD., mixture ratio p,p'-BPF:o,p'-BPF:o,o'-BPF=about 35:48:17) (14.31 g) were added, stirred and dissolved, and then the resulting alkaline aqueous solution was transferred into a 1 L reaction bath. Then, benzyltriethylammonium chloride (0.1862 g) and p-t-butylphenol (0.4294 g) were sequentially added to the reaction bath.

Separately, a mixed solution of terephthalic acid chloride (29.35 g) and dichloromethane (560 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours. Then, acetic acid (4.96 ml) was added thereto, followed by stirring for 30 minutes. Then, stirring was stopped, and an organic layer was separated. The organic layer was washed with a 0.1 N sodium hydroxide aqueous solution (560 ml) two times, and then washed with a 0.1 N hydrochloric acid (560 ml) two times, and further washed with demineralized water (560 ml) two times.

The precipitate obtained by pouring the organic layer after washing into methanol (2.800 ml) was taken out by filtration, and dried to obtain an aimed resin G. The viscosity-average molecular weight of the obtained resin G was 39,100. The structural formula is shown below:

Separately, a mixed solution of terephthalic acid chloride (26.64 g) and dichloromethane (211 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was continued for 2 hours. Then, acetic acid (4.58 ml) was added

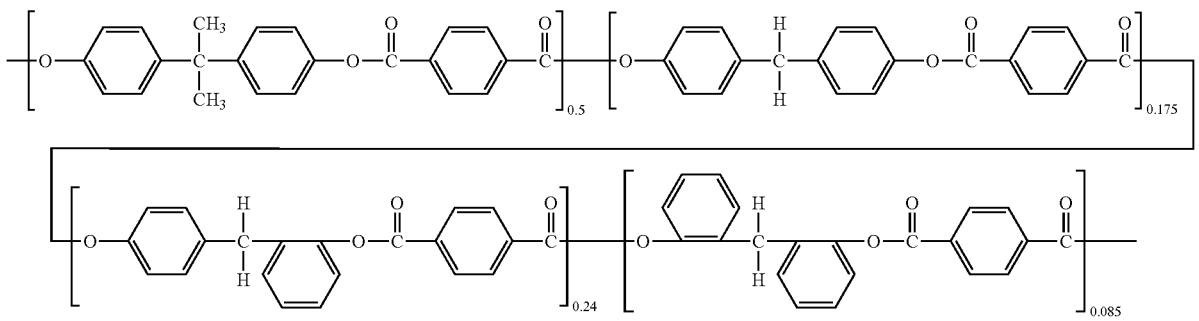

The numerical value after each repeating structure represents the molar ratio.

Preparation Example 8

Preparation of Resin H of Comparative Example 3

Sodium hydroxide (12.62 g) and demineralized water (423 ml) were weighed out in a 1 L beaker, and dissolved with stirring. To the obtained solution, BPC (21.35 g) and a mixture of p,p'-BPF, o,p'-BPF and o,o'-BPF (BPF-D, manufactured by HONSHU CHEMICAL INDUSTRY CO., LTD., mixture ratio p,p'-BPF:o,p'-BPF:o,o'-BPF=about 35:48:17) (7.15 g) were added, stirred and dissolved, and then the resulting alkaline aqueous solution was transferred into a 1 L reaction bath. Then, benzyltriethylammonium chloride (0.3152 g) and 2,3,5-trimethylphenol (0.5996 g) were sequentially added to the reaction bath.

thereto, followed by stirring for 30 minutes. Then, stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (2,800 ml) was taken out by filtration, and dried to obtain an aimed resin H. The viscosity-average molecular weight of the obtained resin H was 40,900. The structural formula is shown below:

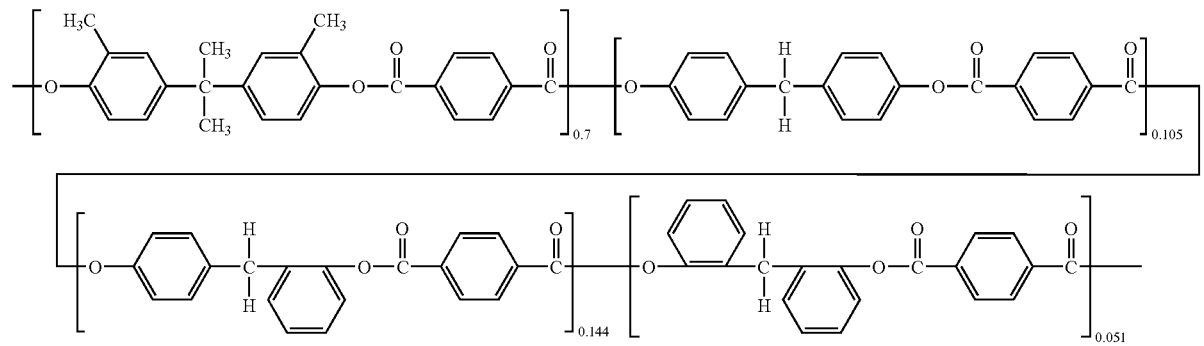

The numerical value after each repeating structure represents the molar ratio.

Preparation Example 9

Preparation of Resin I of Comparative Example 4

Sodium hydroxide (12.64 g) and demineralized water (423 ml) were weighed out in a 1 L beaker, and dissolved is with stirring. To the obtained solution, bis(4-hydroxy-3,5-dimethylphenyl)methane (hereinafter sometimes referred to as Tm-BPF) (21.39 g) and a mixture of p,p'-BPF, o,p'-BPF and o,o'-BPF (BPF-D, manufactured by HONSHU CHEMICAL INDUSTRY CO., LTD., mixture ratio p,p'-BPF:o,p'-BPF:o,o'-BPF=about 35:48:17) (7.16 g) were added, stirred and dissolved, and then the resulting alkaline aqueous solution was transferred into a 2 L reaction bath. Then, benzyltriethylammonium chloride (0.3158 g) and 2,3,6-trimethylphenol (0.600 g) were sequentially added to the reaction bath.

Separately, a mixed solution of terephthalic acid chloride (24.56 g) and dichloromethane (211 ml) was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was continued for 5 hours. Then, acetic acid (4.59 ml) was added thereto, followed by stirring for 30 minutes. Then, stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (3,000 ml) was taken out by filtration, and dried to obtain an aimed resin I. The viscosity-average molecular weight of the obtained resin I was 49,000. The structural formula is shown below:

The numerical value after each repeating structure represents the molar ratio.

Preparation Example 10

Preparation of Resin J of Example 6

Sodium hydroxide (12.99 g) and demineralized water (423 ml) were weighed out in a 1 L beaker, and dissolved with stirring. The obtained aqueous solution, BPE (13.12 g) and BPOCE (14.84 g) were mixed and dissolved with stirring, and then the resulting alkaline aqueous solution was transferred into a 1 L reaction bath. Then, benzyltriethylammonium chloride (0.3244 g) and p-tert-butylphenol (0.681 g) were sequentially added to the reaction bath.

Separately, terephthalic acid chloride (25.35 g) was dissolved in dichloromethane (211 ml) and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 1 hour. Stirring was further continued for 5 hours, and then dichloromethane (350 ml) was added thereto, and stirring was continued for 2 hours. Then, acetic acid (5.10 ml) was added thereto, followed by stirring for 30 minutes. Then, stirring was stopped, and an organic layer was separated. The organic layer was washed with a 0.1 N sodium hydroxide aqueous solution (423 ml) two times, and then washed with a 0.1 N hydrochloric acid (423 ml) two times, and further washed with demineralized water (423 ml) two times.

The precipitate obtained by pouring the organic layer after washing into methanol (3,000 ml) was taken out by filtration, and dried to obtain an aimed aromatic polyester resin J. The viscosity-average molecular weight of the obtained resin was 69,500. The structural formula is shown below:

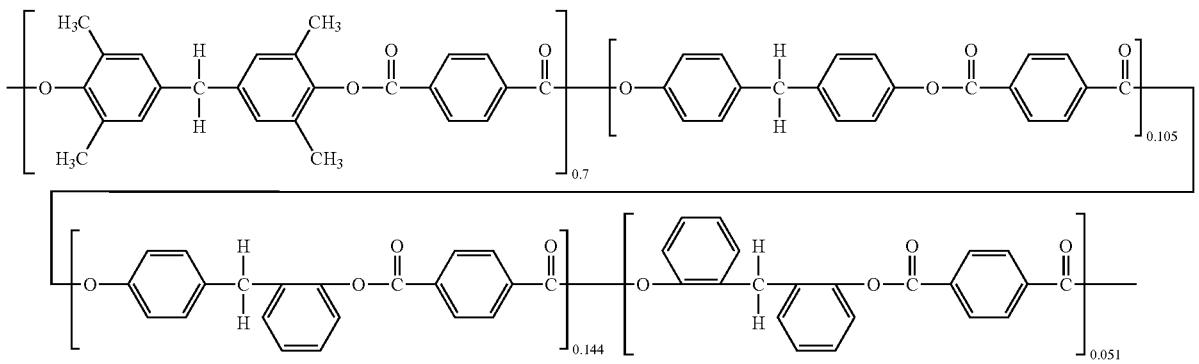

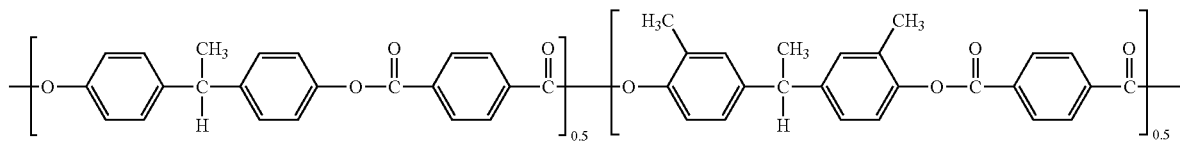

The numerical value after each repeating structure represents the molar ratio.

The numerical value after each repeating structure represents the molar ratio.

Preparation Example 11

Preparation of Resin K of Example 7

Sodium hydroxide (13.72 g) and demineralized water (423 ml) were weighed out in a 1 L beaker, and dissolved with stirring. To the obtained solution, BPOCE (6.27 g) and a mixture of p,p'-BPF and o,p'-BPF (p,p':o,p'=about 40:60) (20.73 g) were added and dissolved with stirring, and then the resulting alkaline aqueous solution was transferred into a 1 L reaction bath. Then, benzyltriethylammonium chloride (0.3427 g) and p-tert-butylphenol (0.719 g) were sequentially added to the reaction bath.

Separately, terephthalic acid chloride (26.78 g) was dissolved in dichloromethane (211 ml) and the resulting solution was transferred into a dropping funnel. Then, in the same manner as in Preparation Example 10, an aimed aromatic polyester resin K was obtained. The viscosity-average molecular weight of the obtained resin was 40,900. The structural formula is shown below:

Preparation Example 12

Preparation of Resin L of Example 8

Sodium hydroxide (13.59 g) and demineralized water (423 ml) were weighed out in a 1 L beaker, and dissolved with stirring. To the obtained solution, BPOCE (3.23 g) and a mixture of p,p'-BPF and o,p'-BPF (p,p':o,p'=about 40:60) (24.02 g) were added and dissolved with stirring, and then the resulting alkaline aqueous solution was transferred into a 1 L reaction bath. Then, benzyltriethylammonium chloride (0.3438 g) and p-tert-butylphenol (0.182 g) were sequentially added to the reaction bath.

Separately, terephthalic acid chloride (27.22 g) was dissolved in dichloromethane (211 ml) and the resulting solution was transferred into a dropping funnel. Then, in the same manner as in Preparation Example 10, an aimed aromatic polyester resin L was obtained. The viscosity-average molecular weight of the obtained resin was 43,900. The structural formula is shown below:

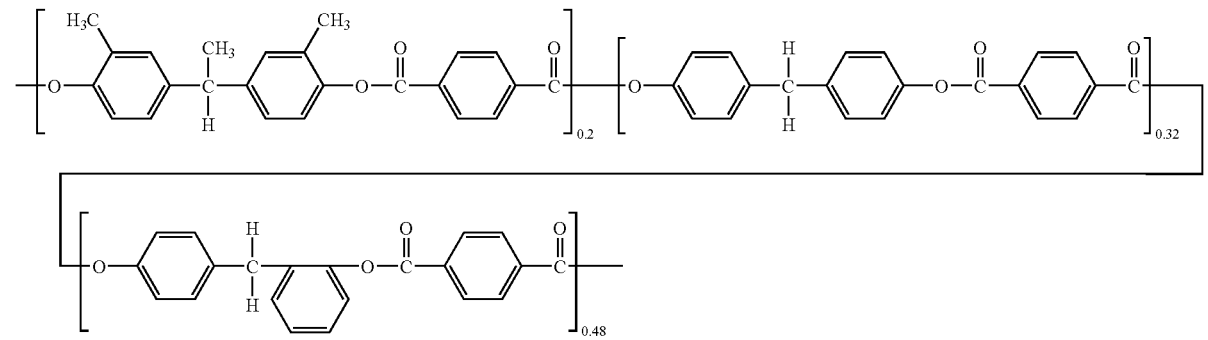

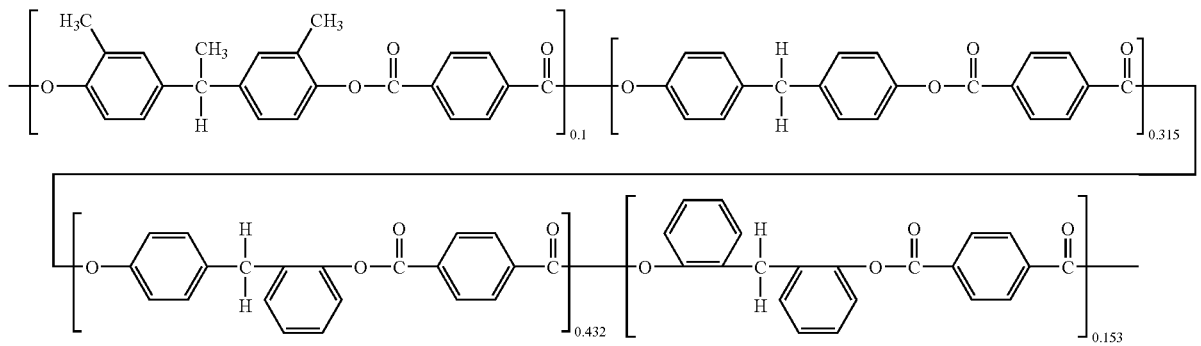

The numerical value after each repeating structure represents the molar ratio.

Preparation Example 13

Preparation of Resin M of Example 9

Sodium hydroxide (13.72 g) and demineralized water (423 ml) were weighed out in a 1 L beaker, and dissolved with stirring. To the obtained solution, 1-(4-hydroxyphenyl)-1-(4-hydroxy-3-methylphenyl)ethane (hereinafter sometimes referred to as PHOCE) (8.86 g) and a mixture of p,p'-BPF and o,p'-BPF (p,p':o,p'=about 40:60) (18.14 g) were added and dissolved with stirring, and then the resulting alkaline aqueous solution was transferred into a 1 L reaction bath. Then, benzyltriethylammonium chloride (0.3427 g) and p-tert-butylphenol (0.719 g) were sequentially added to the reaction bath.

Separately, terephthalic acid chloride (26.78 g) was dissolved in dichloromethane (211 ml) and the resulting solution was transferred into a dropping funnel. Then, in the same manner as in Preparation Example 10, an aimed aromatic polyester resin M was obtained. The viscosity-average molecular weight of the obtained resin was 32,700. The structural formula is shown below:

The numerical value after each repeating structure represents the molar ratio.

Preparation Example 14

Preparation of Aromatic Polyester Polycarbonate Resin N to be Used for Examples 7 to 9

(Preparation of Polycarbonate Oligomer)

A mixture of 100 parts by weight of BPC, 37.8 parts by weight of sodium hydroxide, 568 parts by weight of water, 0.284 part by weight of sodium hydrosulfite and 446 parts by weight of dichloromethane was charged into a reaction bath equipped with a stirrer, and stirred. While keeping the temperature of the reaction bath at from 0 to 10° C., 94.3 parts by weight of phosgene was blown over a period of about 5 hours to carry out the reaction. After completion of the reaction, a dichloromethane solution containing a polycarbonate oligomer alone was collected. Result of analysis of the obtained dichloromethane solution of an oligomer were as follows.
Oligomer concentration (note 1): 16.8 wt %
Terminal chloroformate group concentration (note 2): 0.479 N
Terminal phenolic hydroxyl group concentration (note 3): 0.250 N
(Note 1): Measured by evaporating the solution to dryness.
(Note 2): Aniline hydrochloride obtained by reacting with aniline was subjected to neutralization titration with a 0.2 N sodium hydroxide aqueous solution.

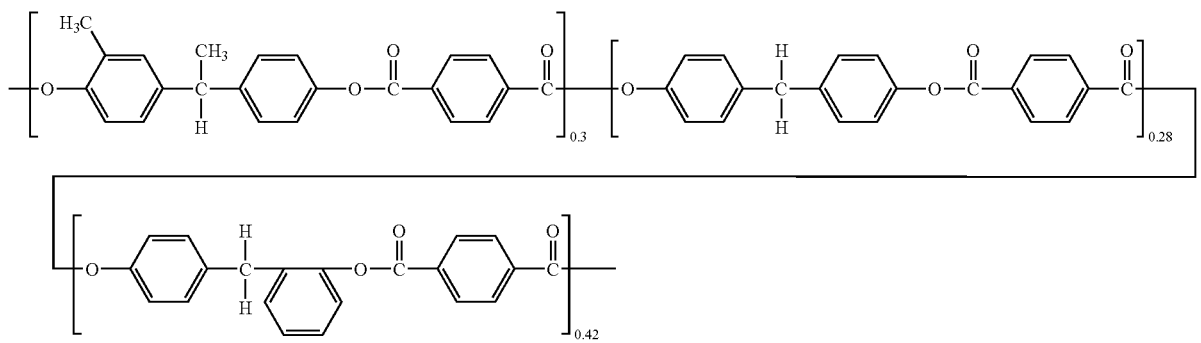

(Note 3): Color development when dissolved in dichloromethane, titanium tetrachloride or an acetic acid solution was determined by colorimetry at 546 nm.

(Preparation of Aromatic Polyester Polycarbonate Resin)

Sodium hydroxide (4.39 g), demineralized water (87.9 ml), BPC (7.421 g) and benzyltriethylammonium chloride (0.3957 g) were added to a 100 mL beaker, and dissolved with stirring to prepare an alkaline aqueous solution.

Then, the above produced polycarbonate oligomer (209.52 ml) and dichloromethane (42 ml) were charged into a 2 L reaction bath equipped with a stirrer, and the external temperature of the polymerization bath was kept at 20° C. while stirring at 200 rpm. Then, the above prepared alkaline aqueous solution was sequentially added to initiate the polymerization reaction. After stirring was continued for 3 hours, 200 ml of demineralized water was added and stirring was stopped. At that time, 5 ml of a dichloromethane layer was sampled so as to measure the viscosity-average molecular weight of the formed polycarbonate block. 5 ml of demineralized water and 0.2 ml of a 35% hydrochloric acid were added to the sampled dichloromethane solution and stirred, and then the solution was left at rest.

Separately, sodium hydroxide (15.98 g), demineralized water (600 ml), a mixture of p,p'-BPF, o,p'-BPF and o,o'-BPF (BPF-D, manufactured by HONSHU CHEMICAL INDUSTRY CO., LTD., p,p':o,p':o,o'=about 35:48:17) (29.43 g) and p-tert-butylphenol (0.441 g) were added to a 1,000 ml beaker, and dissolved with stirring, and then the alkaline aqueous solution was added to the reaction bath. Then, while stirring at 200 rpm, 200 ml of dichloromethane was further added.

Separately, terephthalic acid chloride (31.19 g) was dissolved in dichloromethane (150 ml) and the resulting solution was transferred into a dropping funnel.

While stirring the solution in the reaction bath, the dichloromethane solution was dropwise added thereto from the dropping funnel over 30 minutes. Stirring was further continued at 300 rpm for 3 hours, and then dichloromethane (400 ml) was added thereto, and stirring was continued for 3.5 hours. Then, acetic acid (5.79 ml) was added thereto, followed by stirring for 30 minutes, and then stirring was stopped, and an organic layer was separated. The organic layer was washed with a 0.1 N sodium hydroxide aqueous solution (940 ml) two times, and then washed with 0.1 N hydrochloric acid (940 ml) two times, and further washed with demineralized water (940 ml) two times.

The precipitate obtained by pouring the organic layer after washing into methanol (4,900 ml) was taken out by filtration, and dried to obtain an aimed aromatic polyester polycarbonate resin N. The viscosity-average molecular weight of the obtained resin was 57,900. Further, the dichloromethane solution sampled in the middle of the polymerization was washed with dematerialized water once, and the organic layer was poured into methanol (30 ml), and the obtained precipitate was subjected to filtration and dried to obtain a polycarbonate block. The viscosity-average molecular weight of the obtained polycarbonate block was 12,900.

The compositions and the viscosity-average molecular weights of the resins prepared in Preparation Examples are summarized in Table 1.

TABLE 1

| | | Repeating structures and proportions thereof constituting the resin (%) | | | | | | | | | |
|---|---|---|---|---|---|---|---|---|---|---|---|
| | | Constituent of formula (1) | | | Constituent not defined by the present invention | | | | | | Viscosity-average molecular weight (Mv) |
| | Resin | BPOCE | BPE | PHOCE | BPOCF | BPA | BPC | Tm-BPF | p,p'-BPF | o,p'-BPF | o,o'-BPF | |
| Prep. Ex. 1 | A | 100 | — | — | — | — | — | — | — | — | — | 54,200 |
| Prep. Ex. 2 | B | 50 | — | — | 50 | — | — | — | — | — | — | 66,400 |
| Prep. Ex. 3 | C | — | 50 | — | — | — | — | — | 17.5 | 24 | 8.5 | 32,900 |
| Prep. Ex. 4 | D | 70 | — | — | — | — | — | — | 12 | 18 | — | 44,800 |
| Prep. Ex. 5 | E | 30 | — | — | — | — | — | — | 24.5 | 33.6 | 11.9 | 59,600 |
| Prep. Ex. 6 | F | — | — | — | — | — | 100 | — | — | — | — | 52,400 |
| Prep. Ex. 7 | G | — | — | — | — | 50 | — | — | 17.5 | 24 | 8.5 | 39,100 |
| Prep. Ex. 8 | H | — | — | — | — | — | 70 | — | 10.5 | 14.4 | 5.1 | 40,900 |
| Prep. Ex. 9 | I | — | — | — | — | — | — | 70 | 10.5 | 14.4 | 5.1 | 49,000 |
| Prep. Ex. 10 | J | 50 | 50 | — | — | — | — | — | — | — | — | 69,500 |
| Prep. Ex. 11 | K | 20 | — | — | — | — | — | — | 32 | 48 | — | 40,900 |
| Prep. Ex. 12 | L | 10 | — | — | — | — | — | — | 31.5 | 43.2 | 15.3 | 43,900 |
| Prep. Ex. 13 | M | — | — | 30 | — | — | — | — | 28 | 42 | — | 32,700 |

Abbreviations represent repeating structures of polyester resins derived from bivalent phenols represented by the respective abbreviations.

(Production of photoreceptor)

Example 1

10 Parts by weight of oxytitanium phthalocyanine showing intense diffraction peaks at Bragg angles (2θ±0.2) of 9.3°, 10.6°, 13.2°, 15.1°, 15.7°, 16.1°, 20.8°, 23.3°, 26.3° and 27.1° in X-ray diffraction by CuKα ray, and 150 parts by weight of 4-methoxy-4-methylpentanone-2 were mixed, and subjected to grinding and dispersion treatment by a sand grinding mill to prepare a pigment dispersion. With this pigment dispersion, 50 parts by weight of a 5 wt % 1,2-dimethoxyethane solution of polyvinyl butyral (manufactured by Denki Kagaku Kogyo Kabushiki Kaisha, tradename "Denka Butyral #6000C) and 50 parts by weight of a 5 wt % 1,2-dimethoxyethane solution is of a phenoxy resin (manufactured by Union Carbide, tradename PKHH) were mixed, and an appropriate amount of 1,2-dimethoxyethane was added to prepare a dispersion having a final solid content concentration of 4.0%.

The coating liquid for formation of a charge generation layer thus obtained was coated and dried on a polyethylene terephthalate film having aluminum vapor deposited on its surface so that the film thickness would be 0.4 µm after drying to provide a charge generation layer.

On the charge generation layer, a coating liquid for formation of a charge transport layer, obtained by mixing 50 parts by weight of a charge transport material comprising isomers composed mainly of the following charge transport material (1):

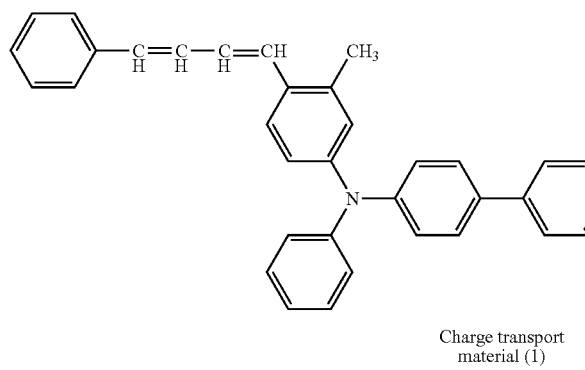
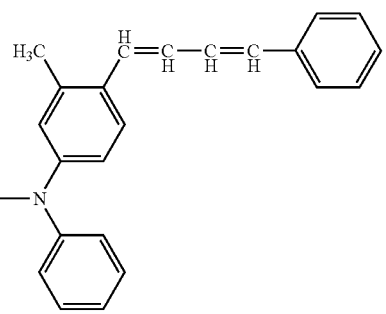

Charge transport material (1)

100 parts by weight of the resin A prepared in Preparation Example 1, 8 parts by weight of an antioxidant (Irganox 1076), 0.03 part by weight of a silicone oil as a leveling agent and 640 parts by weight of a mixed solvent of tetrahydrofuran and toluene (tetrahydrofuran 80 wt %, toluene 20 wt %) was coated, followed by drying at 125° C. for 20 minutes to provide a charge transport layer so that the film thickness would be 20 µm after drying, thereby to produce a photoreceptor A. Here, the solubility of the resin A in the mixed solvent of tetrahydrofuran and toluene was good. Further, even after this coating liquid for formation of a charge transport layer was left to stand at room temperature for 1 week, no change such as solidification was observed.

Example 2

The same operation as in Example 1 was carried out except that the resin B was used instead of the resin A for the coating liquid for formation of a charge transport layer, to produce a photoreceptor B. After the coating liquid for formation of a charge transport layer was left to stand at room temperature for 1 week, no change such as solidification was observed.

Example 3

The same operation as in Example 1 was carried out except that the resin C was used instead of the resin A for the coating liquid for formation of a charge transport layer, and that dichloroethane was used instead of the mixed solvent of tetrahydrofuran and toluene, to produce a photoreceptor C. After the coating liquid for formation of a charge transport layer was left to stand at room temperature for 1 week, no change such as solidification was observed.

Examples 4 and 5

The same operation as in Example 1 was carried out except that the resin D or E was used instead of the resin A for the coating liquid for formation of a charge transport layer, to produce photoreceptors D and E. After the coating liquid for formation of a charge transport layer was left to stand at room temperature for 1 week, no change such as solidification was observed.

Example 6

The same operation as in Example 1 was carried out except that the resin J prepared in Preparation Example 10 and the following charge transport material (2) were used instead of the resin A and the charge transport material (1) for the coating liquid for formation of a charge transport layer, to produce a photoreceptor J. After the coating liquid for formation of a charge transport layer was left to stand at room temperature for 1 week, no change such as solidification was observed. The results of abrasion test and measurement of electric characteristics are shown in Table 2.

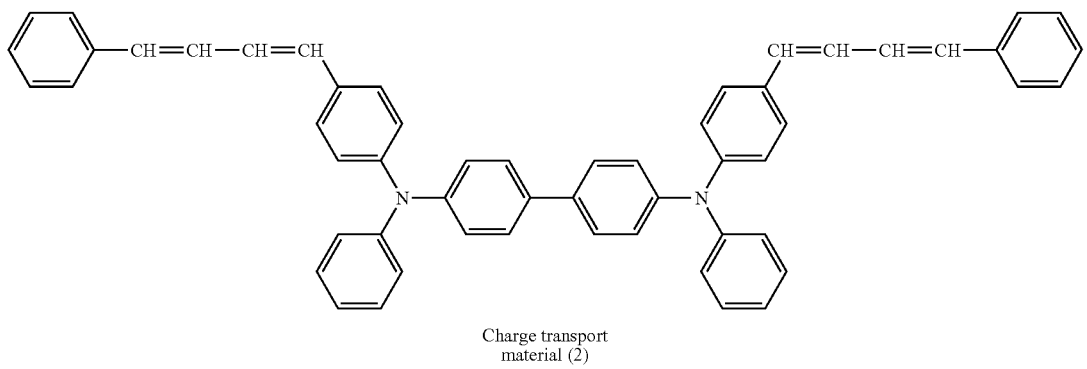

Charge transport material (2)

Example 7

The same operation as in Example 6 was carried out except that a mixture comprising 90 parts by weight of the resin K prepared in Preparation Example 11 and 10 parts by weight of the resin N prepared in Preparation Example 14 was used instead of the resin J for the coating liquid for formation of a charge transport layer, to produce a photoreceptor K. After the coating liquid for formation of a charge transport layer was left to stand at room temperature for 1 week, no change such as solidification was observed. The results of abrasion test and measurement of electric characteristics are shown in Table 2.

Example 8

The same operation as in Example 7 was carried out except that the resin L prepared in Preparation Example 12 was used instead of the resin K for the coating liquid for formation of a charge transport layer, to produce a photoreceptor L. After the coating liquid for formation of a charge transport layer was left to stand at room temperature for 1 week, no change such as solidification was observed. The results of abrasion test and measurement of electric characteristics are shown in Table 2.

Example 9

The same operation as in Example 7 was carried out except that the resin M prepared in Preparation Example 12 was used instead of the resin K for the coating liquid for formation of a charge transport layer, to produce a photoreceptor M. After the coating liquid for formation of a charge transport layer was left to stand at room temperature for 1 week, no change such as solidification was observed. The results of abrasion test and measurement of electric characteristics are shown in Table 2.

Comparative Examples 1 and 2

The same operation as in Example 3 was carried out except that the resin F or G was used instead of the resin C for the coating liquid for formation of a charge transport layer, to produce photoreceptors F and G.

Comparative Examples 3 and 4

The same operation as in Example 1 was carried out except that the resin H or I was used instead of the resin A for the coating liquid for formation of a charge transport layer, to produce photoreceptors H and I.

The obtained photoreceptors A to M were subjected to the following evaluations.

(Electric Characteristics)

By using an electrophotographic characteristic evaluation apparatus (described on pages 404 to 405 in "Electrophotography—Bases and applications, second series" edited by the Society of Electrophotography, Published by Corona Co.), manufactured in accordance with the measurement standard by the Society of Electrophotography, a test was carried out in the following manner. The photoreceptor was stuck on a drum made of aluminum to be formed in cylinder, and the continuity between the drum made of aluminum and the aluminum substrate of the photoreceptor was ensured. Then, the drum was rotated at a constant rpm to perform the electric characteristic evaluation test by cycles of charging, exposure, potential measurement, and charge removal. In this step, the initial surface potential was set at −700 V, exposure was carried out by using a 780-nm monochromatic light, the charge removal was carried out by using a 660-nm monochromatic light, and the surface potential (hereinafter sometimes referred to as VL) at the time of irradiation with 2.4 $\mu J/cm^2$ of the exposure light was measured. For the VL measurement, the time required for exposure-potential measurement was set at 139 ms. The measurements were carried out under the environment of a temperature of 25° C. and a relative humidity of 50% (hereinafter sometimes referred to as NN environment), and a temperature of 5° C. and a relative humidity of 10% (hereinafter sometimes referred to as LL environment). The smaller the absolute value of the VL value, the better the response characteristics. The results are shown in Table 2.

(Abrasion Test)

A photoreceptor film was cut in circle with a diameter of 10 cm to carry out the abrasion evaluation by means of a Taber abrader (manufactured by Toyo Seiki Seisaku-syo, LTD.). Under the test conditions of 23° C., and 50% RH atmosphere, using a truck wheel CS-10F, and no load (the truck wheel's own weight), the abrasion amount after 1,000 revolutions was determined by comparing the weights before and after the test. The results are shown in Table 2.

TABLE 2

Electric characteristics and abrasion resistance of photoreceptor

| Photoreceptor | Resin | VL:NN | VL:LL | Abrasion test Abrasion amount (mg) |
|---|---|---|---|---|
| | | Electric characteristics (−v) | | |
| Ex. 1 | A | A | 28 | 60 | 2.1 |
| Ex. 2 | B | B | 27 | 53 | 1.7 |
| Ex. 3 | C | C | 21 | 56 | 2.7 |

TABLE 2-continued

| | | Electric characteristics and abrasion resistance of photoreceptor | | |
|---|---|---|---|---|
| | | Electric characteristics (-v) | | Abrasion test Abrasion amount |
| Photoreceptor | Resin | VL:NN | VL:LL | (mg) |
| Ex. 4 | D | D | 29 | 58 | 1.5 |
| Ex. 5 | E | E | 44 | 75 | 1.8 |
| Ex. 6 | J | J | 45 | 86 | 0.4 |
| Ex. 7 | K | K/N = 9/1 | 78 | 119 | 0.9 |
| Ex. 8 | L | L/N = 9/1 | 82 | 138 | 0.5 |
| Ex. 9 | M | M/N = 9/1 | 77 | 133 | 0.4 |
| Comp. Ex. 1 | F | F | 30 | 56 | 4.0 |
| Comp. Ex. 2 | G | G | 29 | 56 | 3.1 |
| Comp. Ex. 3 | H | H | 32 | 59 | 3.4 |
| Comp. Ex. 4 | I | I | 48 | 76 | 3.0 |

From the above results, it is found that the polyester resin of the present invention shows a high solubility in a solvent which is commonly used for a coating liquid for formation of a charge transport layer and a high stability of the coating liquid, and that an electrophotographic photoreceptor containing such a polyester resin is excellent in mechanical properties, abrasion resistance and electric characteristics.

(Preparation of Photoreceptor Drum)

(Preparation of Dispersion for Undercoat Layer)

Titanium oxide (manufactured by Ishihara Sangyo Kaisha, Ltd., tradename TTO55N (average primary particle size about 40 nm)) and methyldimethoxysilane in an amount of 3 wt % relative to the titanium oxide, were mixed with methanol in an amount double the weight of the titanium oxide to obtain a slurry. The slurry after dried was subjected to heat treatment at from 120° C. to 140° C. for 30 minutes, and further washed with methanol and dried to obtain a hydrophobized titanium oxide, which was dispersed in a mixed solvent of methanol/1-propanol=7/3 by a ball mill to obtain a dispersed slurry of the hydrophobized titanium oxide. The dispersed slurry, a mixed solvent of methanol/1-propanol (weight ratio 7/3) and pellets of a copolymerized polyamide comprising ε-caprolactam (following formula A)/bis(4-amino-3-methylcyclohexyl)methane (following formula B)/hexamethylenediamine (following formula C)/decamethylenedicarboxylic acid (following formula D)/octadecamethylenedicarboxylic acid (following formula E) with a compositional molar ratio of 60%/15%/5%/15%/5% were stirred and mixed with heating to dissolve the polyamide pellets, and then ultrasonic dispersion treatment was carried out to prepare a dispersion for an undercoat layer having a solid content concentration of 16 wt %, containing hydrophobized titanium oxide/copolymerized polyamide in a weight ratio of 3/1:

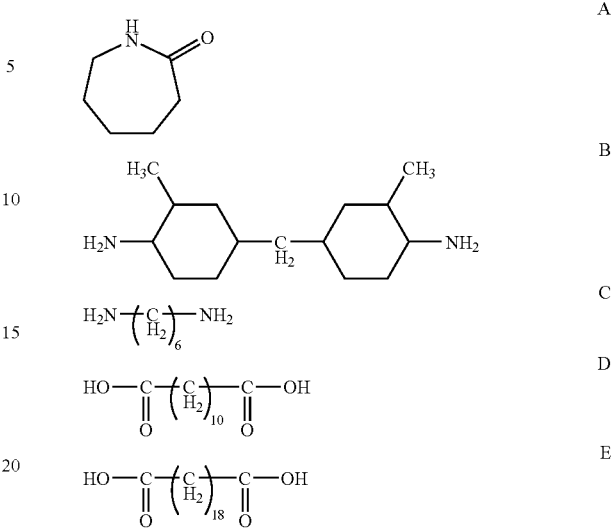

(Preparation of Dispersion for Charge Generation Layer)

10 Parts of oxytitanium phthalocyanine having intense diffraction peaks at Bragg angles (2θ±0.2) of 9.3°, 10.6°, 13.2°, 15.1°, 15.7°, 16.1°, 20.8°, 23.3°, 26.3° and 27.1° in X-ray diffraction by CuKα ray was added to 150 parts of 1,2-dimethoxyethane, and grinding dispersion treatment was carried out by a sand grinding mill to prepare a pigment dispersion.

5 Parts of polyvinyl butyral (manufactured by Denki Kagaku Kogyo Kabushiki Kaisha, tradename "Denka Butyral #6000C") was dissolved in 95 parts of 1,2-dimethoxyethane to prepare a binder solution 1 having a solid content concentration of 5%.

5 Parts of a phenoxy resin (manufactured by Union Carbide, tradename PKHH) was dissolved in 95 parts of 1,2-dimethoxyethane to prepare a binder solution 2 having a solid content concentration of 5%.

To 160 parts of the above prepared pigment dispersion, 50 parts of the binder solution 1, 50 parts of the binder solution 2, 1,2-dimethoxyethane in an appropriate amount and 4-methoxy-4-methylpentanone-2 in an appropriate amount were added to prepare a dispersion α for a charge generation layer having a solid content concentration of 4.0%, comprising 1,2-dimethoxyethane:4-methoxy-4-methylpentanone-2=9:1.

10 Parts of oxytitanium phthalocyanine showing a greatest diffraction peak at a Bragg angle (2θ±0.2) of 27.3° in X-ray diffraction by CuKα ray was added to 150 parts of 1,2-dimethoxyethane, and grinding dispersion treatment was carried out by a sand grinding mill to prepare a pigment dispersion.

To 160 parts of this pigment dispersion, 100 parts of a binder solution having a solid content concentration of 5%, having 5 parts of polyvinyl butyral (manufactured by Denki Kagaku Kogyo Kabushiki Kaisha, tradename Denka Butyral #6000C) dissolved in 95 parts of 1,2-dimethoxyethane, 1,2-dimethoxyethane in an appropriate amount and 4-methoxy-4-methylpentanone-2 in an appropriate amount were added to prepare a dispersion β1 for a charge generation layer having a solid content concentration of 4.0%, comprising 1,2-dimethoxyethane:4-methoxy-4-methylpentanone-2=9:1.

10 Parts of oxytitanium phthalocyanine showing intense diffraction peaks at Bragg angles (2θ±0.2) of 9.3°, 10.6°, 13.2°, 15.1°, 15.7°, 16.1°, 20.8°, 23.3°, 26.3° and 27.1° in X-ray diffraction by CuKα ray, was added to 150 parts of 1,2-dimethoxyethane, and grinding dispersion treatment was carried out by a sand grinding mill to prepare a pigment dispersion.

To 160 parts of this pigment dispersion, 100 parts of a binder solution having a solid content concentration of 5%, having S parts of polyvinyl butyral (manufactured by Denki Kagaku Kogyo Kabushiki Kaisha, tradename Denka Butyral #6000C) dissolved in 95 parts of 1,2-dimethoxyethane, 1,2-dimethoxyethane in an appropriate amount and 4-methoxy-4-methylpentanone-2 in an appropriate amount were added to prepare a dispersion β2 for a charge generation layer having a solid content concentration of 4.0%, comprising 1,2-dimethoxyethane:4-methoxy-4-methylpentanone-2=9:1.

The dispersion β1 for a charge generation layer and the dispersion β2 for a charge generation layer were mixed in a ratio of 8:2 to prepare a dispersion β for a charge generation layer.

Example 10

An anodic oxidation treatment was applied to the surface of a cylinder made of an aluminum alloy having an outer diameter of 30 mm, a length of 285 mm and a wall thickness of 1.0 mm, the surface of which was subjected to mirror finish, and then a sealing treatment was carried out by a sealing agent containing nickel acetate as the main component to form an anodic oxide film (alumite film) of about 6 μm. The cylinder was immersed in and coated with the above prepared dispersion α for a charge generation layer to form a charge generation layer so that the film thickness after drying would be 0.3 μm.

Then, the cylinder on which the charge generation layer was formed was immersed in and coated with a liquid comprising 50 parts of the above charge transport material (2), 100 parts of the resin A prepared in Preparation Example 1 as a binder resin for a charge transport layer and 0.05 part of silicone oil (manufactured by Shin-Etsu Chemical Co., Ltd., tradename KF96) dissolved in a mixed solvent of tetrahydrofuran:toluene=80:20 to provide a charge transport layer with a thickness of 20 μm after drying. The photoreceptor drum thus obtained will be referred to as A1.

Example 11

The same operation as in Example 10 was carried out except that the resin D prepared in Preparation Example 4 was used as the binder resin for a charge transport layer, to produce a photoreceptor drum D1.

Example 12

The same operation as in Example 10 was carried out except that the resin E prepared in Preparation Example 5 was used as the binder resin for a charge transport layer, to produce a photoreceptor drum E1.

Comparative Example 7

The same operation as in Example 10 was carried out except that the resin I prepared in Preparation Example 9 was used as the binder resin for a charge transport layer, to produce a photoreceptor drum I1.

Example 13

A cylinder made of an aluminum alloy having an outer diameter of 30 mm, a length of 254 mm and a wall thickness of 0.75 mm, the surface of which was subjected to mirror finish, was immersed in and coated with the above prepared dispersion for an undercoat layer to form an undercoat layer with a film thickness of about 1.3 μm. The cylinder was immersed in and coated with the above prepared dispersion β for a charge generation layer to form a charge generation layer so that the film thickness after drying would be 0.3 μm.

Then, the cylinder on which the charge generation layer was formed, was immersed in and coated with a liquid comprising 50 parts of the above charge transport material (2), 100 parts of the polyacrylate resin A prepared in Preparation Example 1 as a binder resin for a charge transport layer and 0.05 part of a silicone oil (manufactured by Shin-Etsu Chemical Co., Ltd., tradename KF96) dissolved in a mixed solvent of tetrahydrofuran:toluene=80:20 to form a charge transport layer with a film thickness of 25 μm after drying. The photoreceptor drum thus obtained will be referred to as A2.

Example 14

The same operation as in Example 13 was carried out except that the resin D prepared in Preparation Example 4 was used as the binder resin for a charge transport layer, to produce a photoreceptor drum D2.

Example 15

The same operation as in Example 13 was carried out except that the resin E prepared in Preparation Example 5 was used as the binder resin for a charge transport layer, to produce a photoreceptor drum E2.

Comparative Example 8

The same operation as in Example 13 was carried out except that the resin I prepared in Preparation Example 9 was used as the binder resin for a charge transport layer, to produce a photoreceptor drum I2.

Example 16

An anodic oxidation treatment was applied to the surface of a cylinder made of an aluminum alloy having an outer diameter of 30 mm, a length of 346 mm and a wall thickness of 1.0 mm, the surface of which was subjected to mirror finish, and then a sealing treatment was carried out by a sealing agent containing nickel acetate as the main component to form an anodic oxide film (alumite film) of about 6 μm. The cylinder was immersed in and coated with the above prepared dispersion for an undercoat layer to form an undercoat layer with a film thickness of about 1.3 μm. The cylinder was immersed in and coated with the above prepared dispersion β1 for a charge generation layer to form a charge generation layer so that the film thickness after drying would be about 0.3 μm.

Then, the cylinder on which the charge generation layer was formed, was immersed in and coated with a liquid comprising 30 parts of the above charge transport material (2), 100 parts of the resin D prepared in Preparation Example 4 as a binder resin for a charge transport layer, 4 parts of an antioxidant (Irganox 1076) and 0.03 part of a silicone oil (manufactured by Shin-Etsu Chemical Co., Ltd., tradename KF96) dissolved in a mixed solvent of tetrahydrofuran:toluene=80:20 to form a charge transport layer with a film thickness of 25 μm after drying. The photoreceptor drum thus obtained will be referred to as D3.

Example 17

The same operation as in Example 16 was carried out except that the resin E prepared in Preparation Example 5 was used as the binder resin for a charge transport layer, to produce a photoreceptor drum E3.

Comparative Example 9

The same operation as in Example 16 was carried out except that the resin I prepared in Preparation Example 9 was used as the binder resin for a charge transport layer, to produce a photoreceptor drum I3.

(Measurement of Film Reduction Amount by Printing Resistance Test)

Then, each of the photoreceptor drums A1, D1, E1 and I1 was attached to a commercial color laser printer (LP3000C manufactured by Seiko Epson Corporation) to form 24,000 sheets of images in a monochrome (black) mode at room temperature in normal humidity.

At that time, the film thickness of the photosensitive layer before image formation and the film thickness after image formation of 24,000 sheets were measured, and the film reduction amount per 10,000 sheets of the formed images was calculated. The results are shown in Table 3.

Then, each of the photoreceptor drums A2, D2, E2 and I2 was attached to a commercial monochrome laser printer (manufactured by Lexmark International Inc., Optra S2450, 24 sheets/min in A4 longitudinal feed, roller charging by application of direct voltage, roller transfer) to form 30,000 sheets of images at room temperature in normal humidity. The film reduction amount per 10,000 sheets was calculated from the difference in film thickness between before and after image formation. The results are shown in Table 3.

Then, each of the photoreceptor drums D3, E3 and I3 was attached to a commercial digital copying machine (manufactured by Matsushita Electric Industrial Co., Ltd., WORKIO DP3200) to form 30,000 sheets of images at room temperature in normal humidity. The film reduction amount per 10,000 sheets was calculated from the difference in film thickness between before and after image formation. The result are shown in Table 3.

TABLE 3

Film scrape amount of photoreceptor by image formation by commercial image forming apparatus

| Photoreceptor drum | | Film scrape amount of photoreceptor(μm/10,000 sheets) | | |
|---|---|---|---|---|
| | | LP3000C | Optra S2450 | WORKIO DP3200 |
| Ex. 10 | A1 | 0.46 | | |
| Ex. 11 | D1 | 0.48 | | |
| Ex. 12 | E1 | 0.48 | | |
| Comp. Ex. 7 | I1 | 0.75 | | |
| Ex. 13 | A2 | | 0.75 | |
| Ex. 14 | D2 | | 0.71 | |
| Ex. 15 | E2 | | 0.42 | |
| Comp. Ex. 8 | I2 | | 1.04 | |

TABLE 3-continued

Film scrape amount of photoreceptor by image formation by commercial image forming apparatus

| Photoreceptor drum | | Film scrape amount of photoreceptor(μm/10,000 sheets) | | |
|---|---|---|---|---|
| | | LP3000C | Optra S2450 | WORKIO DP3200 |
| Ex. 16 | D3 | | | 1.37 |
| Ex. 17 | E3 | | | 1.33 |
| Comp. Ex. 9 | I3 | | | 2.00 |

The film scrape amount of the photosensitive layer after image formation of 10,000 sheets was small in the photoreceptor of Example as compared with the photoreceptor of Comparative Example by any image forming apparatus, and it is found that the photoreceptor of the present invention is excellent in abrasion resistance.

INDUSTRIAL APPLICABILITY

An electrophotographic photoreceptor applicable to an electrophotographic apparatus such as a printer, a facsimile or a copying machine can be provided.

The entire disclosure of Japanese Patent Application No. 2003-310700 (filed on Sep. 2, 2003) including specifications, claims and summaries are incorporated herein by reference in its entirety.

What is claimed is:

1. An electrophotographic photoreceptor comprising an electroconductive substrate and a photosensitive layer formed thereon, wherein the photosensitive layer contains a polyester resin consisting of a repeating ester structure consisting of at least one bivalent phenol residue having formula (1) and at least one of an aromatic dicarboxylic acid residue having formula (2):

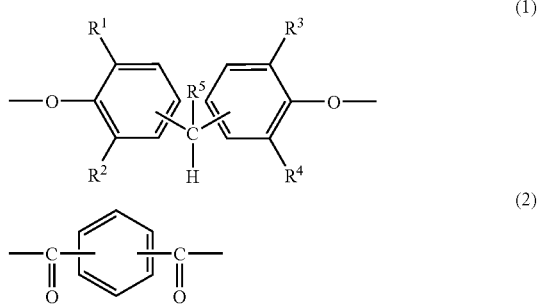

wherein $R^1$ and $R^5$ are each a methyl group and $R^2$ to $R^4$ are hydrogen atoms.

2. The electrophotographic photoreceptor according to claim 1, wherein the aromatic dicarboxylic acid residue represented by formula (2) is a terephthaloyl acid residue.

3. The electrophotographic photoreceptor according to claim 1, wherein the polyester resin has a viscosity average molecular weight ranging from 15,000 to 100,000.

4. The electrophotographic photoreceptor according to claim 1, wherein the photosensitive layer contains a compound represented by formula (7):

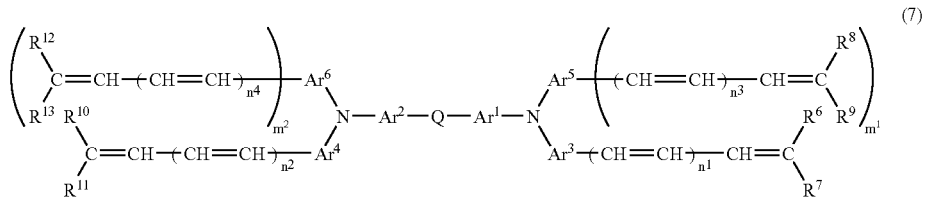

wherein each of $Ar^1$ to $Ar^4$, which are independent of one another, represents an arylene group which optionally is substituted, or a bivalent heterocyclic group which optionally is substituted, each of $m^1$ and $m^2$, which are independent of one another, represents 0 or 1, each of $Ar^5$, when $m^1=0$, and $Ar^6$, when $m^2=0$, represents an alkyl group, which optionally is substituted, an aryl group, which optionally is substituted, or a monovalent heterocyclic group, which optionally is substituted, each of $Ar^5$, when $m^1=1$, and $Ar^6$, when $m^2=1$, represents an alkylene group, which optionally is substituted, an arylene group, which optionally is substituted, or a bivalent heterocyclic group, which is optionally is substituted, Q represents a direct bond or a bivalent residue, each of $R^6$ to $R^{13}$, which are independent of one another, represents hydrogen, an alkyl group, which optionally is substituted, an arylgroup, which optionally is substituted, or a heterocyclic group, and each of $n^1$ to $n^4$, which are independent of one another, represents an integer ranging from 0 to 4, provided that $Ar^1$ to $Ar^6$ may be mutually bonded to form a cyclic structure.

5. An electrophotographic photoreceptor comprising an electroconductive substrate and a photosensitive layer formed thereon, wherein the photosensitive layer contains a polyester resin having
(A) a repeating ester structure of a bivalent phenol residue having formula (1) and at least one aromatic dicarboxylic acid residue having formula (2):

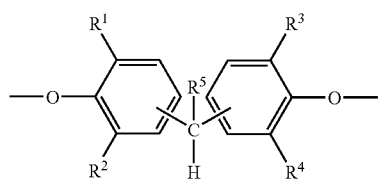

(1)

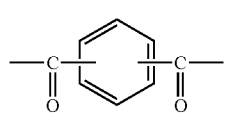

(2)

wherein $R^1$ and $R^5$ are each a methyl group and $R^2$ to $R^4$ are hydrogen atoms, and
(B) a repeating ester structure comprising a bivalent phenol residue having formula (3) below and an aromatic dicarboxylic acid residue having formula (2):

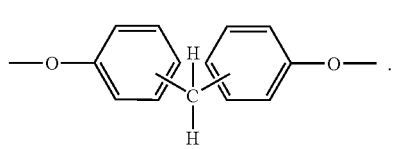

(3)

6. The electrophotographic photoreceptor according to claim 5, wherein the bivalent phenol residue represented by formula (3) has a structure selected from the structures represented by the following formulas (4), (5) and (6), and the polyester resin has at least two types of repeating ester structures comprising such a bivalent phenol residue and an aromatic dicarboxylic acid residue having formula (2):

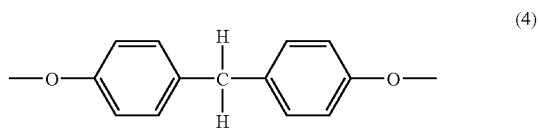

(4)

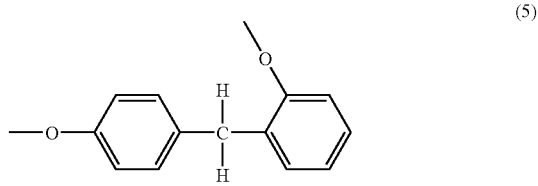

(5)

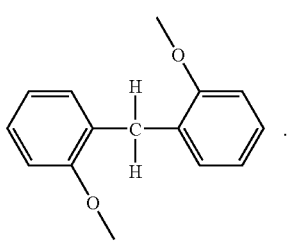

(6)

7. The electrophotographic photoreceptor according to claim 6, wherein at least one bivalent phenol residue represented by formula (3) has a structure represented by formula (4).

8. An electrophotographic photoreceptor comprising an electroconductive substrate and a photosensitive layer formed thereon, wherein the photosensitive layer contains a polyester resin having (A) a repeating ester structure of a bivalent phenol residue having formula (1) and at least one aromatic dicarboxylic acid residue having formula (2),

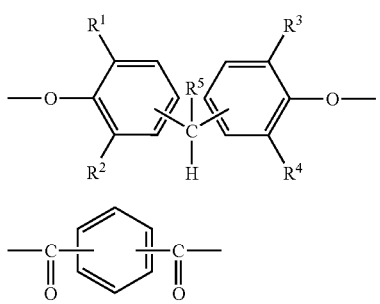 (1)
(2)
wherein $R^1$ and $R^5$ are each a methyl group and $R^2$ to $R^4$ are hydrogen atoms,
and (B) a repeating ester structure of terephthalic acid and a bivalent phenol residue having the following formula:
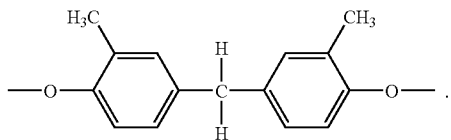
\* \* \* \* \*